United States Patent
Hirasawa

(10) Patent No.: US 10,270,927 B2
(45) Date of Patent: Apr. 23, 2019

(54) CONTROLLING A DISPLAY OF A FUNCTION EXECUTION APPARATUS BASED ON AN EXECUTABLE CONDITION OF A FILE PROCESSING FUNCTION

(71) Applicant: BROTHER KOGYO KABUSHIKI KAISHA, Nagoya, Aichi (JP)

(72) Inventor: Yoshi Hirasawa, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 15 days.

(21) Appl. No.: 15/377,535

(22) Filed: Dec. 13, 2016

(65) Prior Publication Data

US 2017/0180570 A1    Jun. 22, 2017

(30) Foreign Application Priority Data

Dec. 21, 2015    (JP) .................................. 2015-248711

(51) Int. Cl.
| | |
|---|---|
| *H04N 1/00* | (2006.01) |
| *H04N 1/32* | (2006.01) |
| *G06F 3/0481* | (2013.01) |
| *G06F 3/0482* | (2013.01) |

(52) U.S. Cl.
CPC ....... *H04N 1/0048* (2013.01); *H04N 1/00204* (2013.01); *H04N 1/00474* (2013.01); *H04N 1/32625* (2013.01); *H04N 1/32657* (2013.01); *G06F 3/0482* (2013.01); *G06F 3/04817* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 2005/0267989 A1* | 12/2005 | Yamamoto | ............. | G06K 15/00 709/245 |
| 2007/0142952 A1* | 6/2007 | Yamamoto | ........... | G05B 23/027 700/110 |
| 2012/0124522 A1* | 5/2012 | Ookuma | ............. | G06F 3/04817 715/840 |
| 2014/0159882 A1* | 6/2014 | Koh | ........................ | B60R 25/00 340/425.5 |

(Continued)

FOREIGN PATENT DOCUMENTS

JP         2012-103990 A       5/2012

*Primary Examiner* — Miya J Williams
(74) *Attorney, Agent, or Firm* — Scully, Scott, Murphy & Presser, PC

(57) ABSTRACT

A function execution apparatus includes a controller configured to display a standby screen for selecting a specific function from among one or more functions, the one or more functions including a file processing function to use a file storage service provided by a service providing apparatus when data communication with the service providing apparatus is performed through a communication network, determine whether the file processing function is in an executable condition, in response to determining that the file processing function is in an unexecutable condition, display on the standby screen an error image representing that the file processing function is in the unexecutable condition, accept a selection of the specific function in a state where the standby screen is displayed, and execute the selected specific function.

12 Claims, 12 Drawing Sheets

(56) References Cited

U.S. PATENT DOCUMENTS

| | | | | |
|---|---|---|---|---|
| 2015/0036184 A1* | 2/2015 | Hamaguchi | ........ | H04N 1/32363 |
| | | | | 358/1.15 |
| 2015/0156338 A1* | 6/2015 | Terao | ................ | H04N 1/32096 |
| | | | | 358/1.15 |
| 2015/0348499 A1* | 12/2015 | Kasamatsu | ........... | G06F 3/0482 |
| | | | | 345/212 |
| 2016/0227057 A1* | 8/2016 | Jarvis | ................ | H04N 1/00514 |
| 2016/0291812 A1* | 10/2016 | Ogura | ................... | G06F 3/0482 |
| 2017/0010767 A1* | 1/2017 | Hosoda | ................ | G06F 3/0482 |

* cited by examiner

CONTROLLING A DISPLAY OF A FUNCTION EXECUTION APPARATUS BASED ON AN EXECUTABLE CONDITION OF A FILE PROCESSING FUNCTION

CROSS-REFERENCE TO RELATED APPLICATION

This application claims priority under 35 U.S.C. § 119 from Japanese Patent Application No. 2015-248711 filed on Dec. 21, 2015. The entire subject matter of the application is incorporated herein by reference.

BACKGROUND

Technical Field

The following description relates to aspects of a function execution apparatus, a method, and a non-transitory computer-readable storage medium for executing a specific function.

Related Art

Various kinds of function execution apparatuses have been provided that have at least one of functions such as a scanning function and a copy function. Further, in recent years, function execution apparatuses have been spreading that have a function (hereinafter referred to as a "cloud function") to access external servers via a communication network (e.g., the Internet) and use services (hereinafter referred to as "cloud services") provided by the external servers.

Specifically, it is possible to implement the cloud function by installing, into a function execution apparatus, application software (hereinafter referred to as "cloud applications") for using the cloud services and executing the cloud applications on the function execution apparatus. Recently, various kinds of cloud services have been provided. Thus, it is possible to selectively use a plurality of different cloud services by installing into the function execution apparatus respective cloud applications corresponding to the plurality of cloud services.

In general, such a function execution apparatus includes a display configured to display thereon various kinds of information. For instance, on a standby screen to be displayed on the display after the function execution apparatus is booted, information is displayed such as types of available functions and a state of the function execution apparatus. On the standby screen, a user is allowed to select a specific one of the functions and/or check a network connection state of the function execution apparatus. When the cloud function is selected on the standby screen, the screen is switched to an application selecting screen for selecting one of the cloud applications. Thus, by selecting a specific cloud application on the application selecting screen, the user is allowed to use a cloud service corresponding to the specific cloud application.

SUMMARY

The cloud applications are not necessarily available at all times. For example, a cloud application might be unavailable in a case where it has been taking a long time to establish a connection with an external server (hereinafter referred to as a "cloud server") that provides the cloud application, and the connection has not yet been established. Further, for instance, the cloud application might be unavailable in a case where the cloud server fails to authenticate (the user of) the function execution apparatus, or a case where the cloud service is unavailable by some cause on the side of the cloud server.

However, even if the cloud application that the user wishes to use is in an unavailable condition as described above, the user is unable to be aware of the unavailable condition from the standby screen. When the cloud application is in the unavailable condition, the user is not allowed to realize the unavailable condition until the user selects and launches the cloud application on the application selecting screen.

A series of operations up to an operation of selecting the cloud application without knowing the unavailable condition of the cloud application are useless for the user. Thus, the known function execution apparatus is not considered user-friendly with respect to the useless operations.

Aspects of the present disclosure are advantageous to provide one or more improved techniques, for a function execution apparatus configured to use services externally provided via a communication network, which make it possible to use the services in a more user-friendly manner.

According to aspects of the present disclosure, a function execution apparatus is provided, which includes a display, a user interface, a communication interface connectable with a communication network, and a controller configured to display on the display a standby screen for selecting a specific function from among one or more functions of the function execution apparatus, the one or more functions including a file processing function to use a file storage service provided by a service providing apparatus when data communication with the service providing apparatus is performed through the communication network via the communication interface, determine whether the file processing function is in an executable condition, in response to determining that the file processing function is in an unexecutable condition, display on the standby screen an error image representing that the file processing function is in the unexecutable condition, accept, via the user interface, a selection of the specific function from among the one or more functions in a state where the standby screen is displayed, and in response to accepting the selection of the specific function, execute the selected specific function.

According to aspects of the present disclosure, further provided is a method adapted to be implemented on a processor coupled with a function execution apparatus including a display, a user interface, and a communication interface, the method including displaying on the display a standby screen for selecting a specific function from among one or more functions of the function execution apparatus, the one or more functions including a file processing function to use a file storage service provided by a service providing apparatus when data communication with the service providing apparatus is performed through a communication network via the communication interface, determining whether the file processing function is in an executable condition, in response to determining that the file processing function is in an unexecutable condition, displaying on the standby screen an error image representing that the file processing function is in the unexecutable condition, accepting, via the user interface, a selection of the specific function from among the one or more functions in a state where the standby screen is displayed, and in response to accepting the selection of the specific function, executing the selected specific function.

According to aspects of the present disclosure, further provided is a non-transitory computer-readable medium storing computer-readable instructions that are executable by a processor coupled with a function execution apparatus including a display, a user interface, and a communication interface, the instructions being configured to, when executed by the processor, cause the processor to display on the display a standby screen for selecting a specific function from among one or more functions of the function execution apparatus, the one or more functions including a file processing function to use a file storage service provided by a service providing apparatus when data communication with the service providing apparatus is performed through a communication network via the communication interface, determine whether the file processing function is in an executable condition, in response to determining that the file processing function is in an unexecutable condition, display on the standby screen an error image representing that the file processing function is in the unexecutable condition, accept, via the user interface, a selection of the specific function from among the one or more functions in a state where the standby screen is displayed, and in response to accepting the selection of the specific function, execute the selected specific function.

In the present disclosure, what is referred to as "file" may include an image file, a video file, a document file, a sound file, and various kinds of electronic files. Further, the "file storage service" may represent a service for storing various kinds of files and may include at least one of a download service to download a stored file and provide the file to an external device via a network and an upload service to upload a file from an external device via a network and store the file.

BRIEF DESCRIPTION OF THE ACCOMPANYING DRAWINGS

FIGS. 3A, 3B, 3C, and 3D show examples in which one or more error icons are displayed on a standby screen, in the illustrative embodiment according to one or more aspects of the present disclosure.

Figure 4:
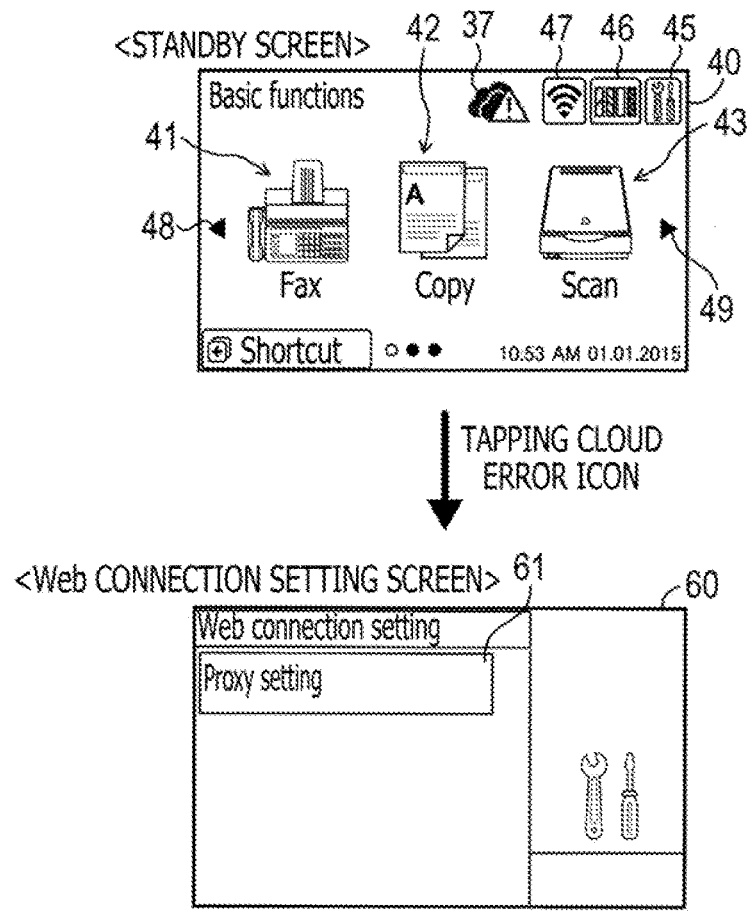

FIG. 4 is an illustration exemplifying a screen transition to be made when a second-type all-error icon is tapped on the standby screen, in the illustrative embodiment according to one or more aspects of the present disclosure.

Figure 5A:
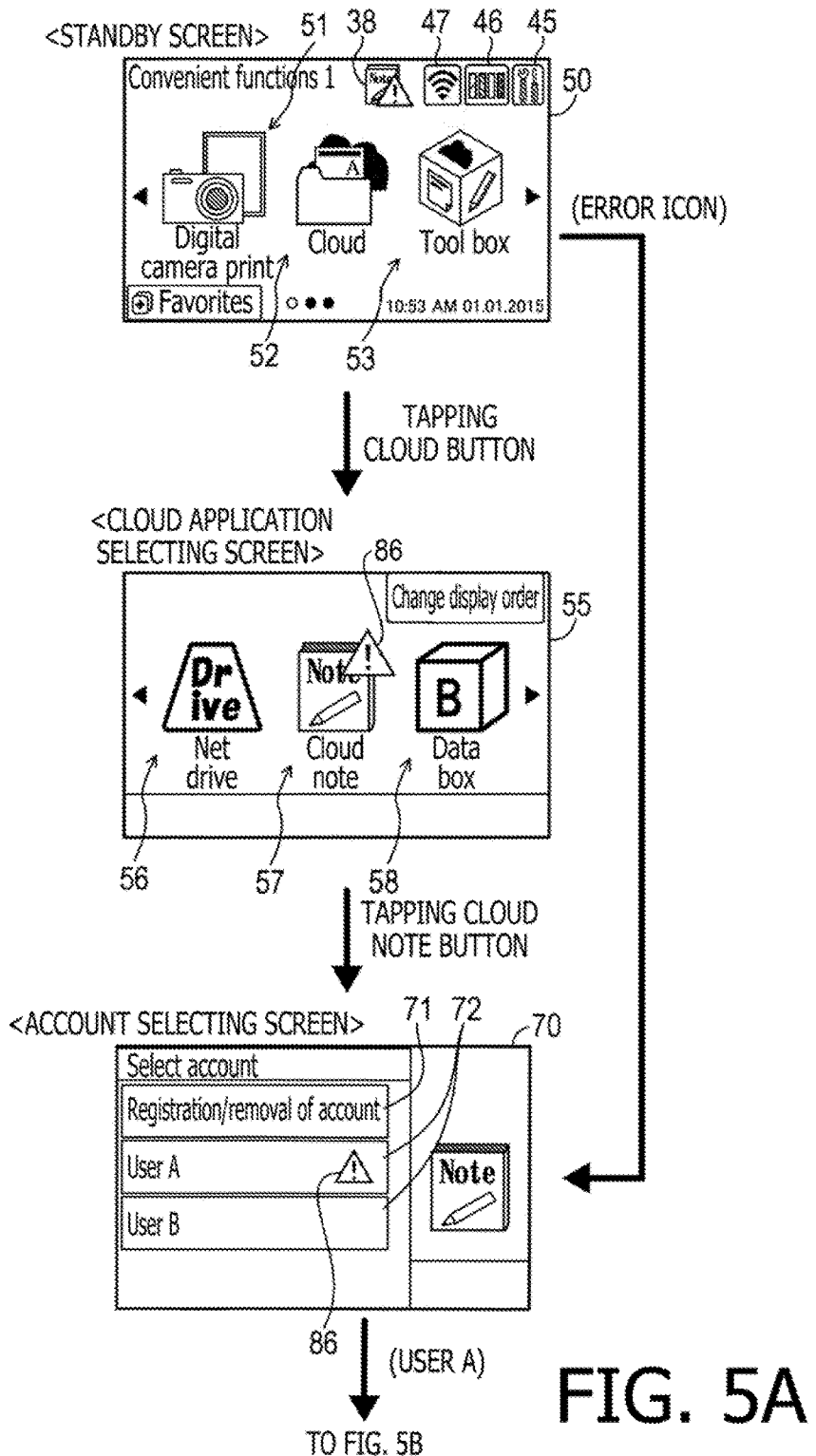
Figure 5B:
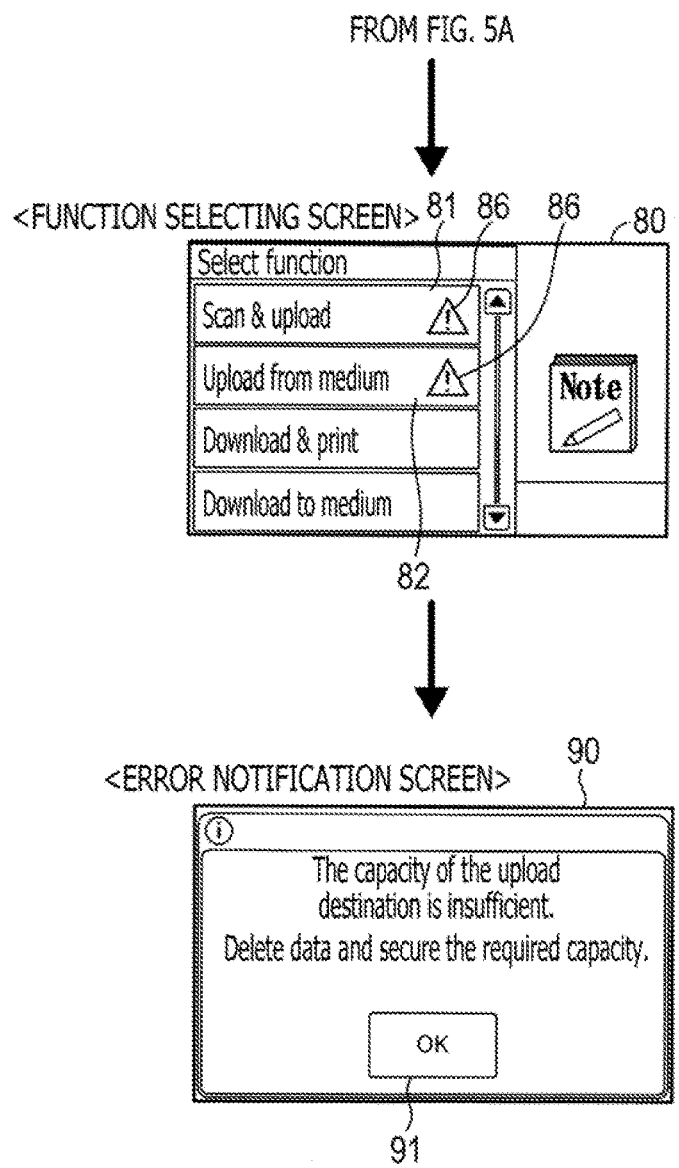

FIGS. 5A and 5B are illustrations exemplifying screen transitions to be made when a second-type individual-error icon is tapped on a standby screen, in the illustrative embodiment according to one or more aspects of the present disclosure.

Figure 6A:
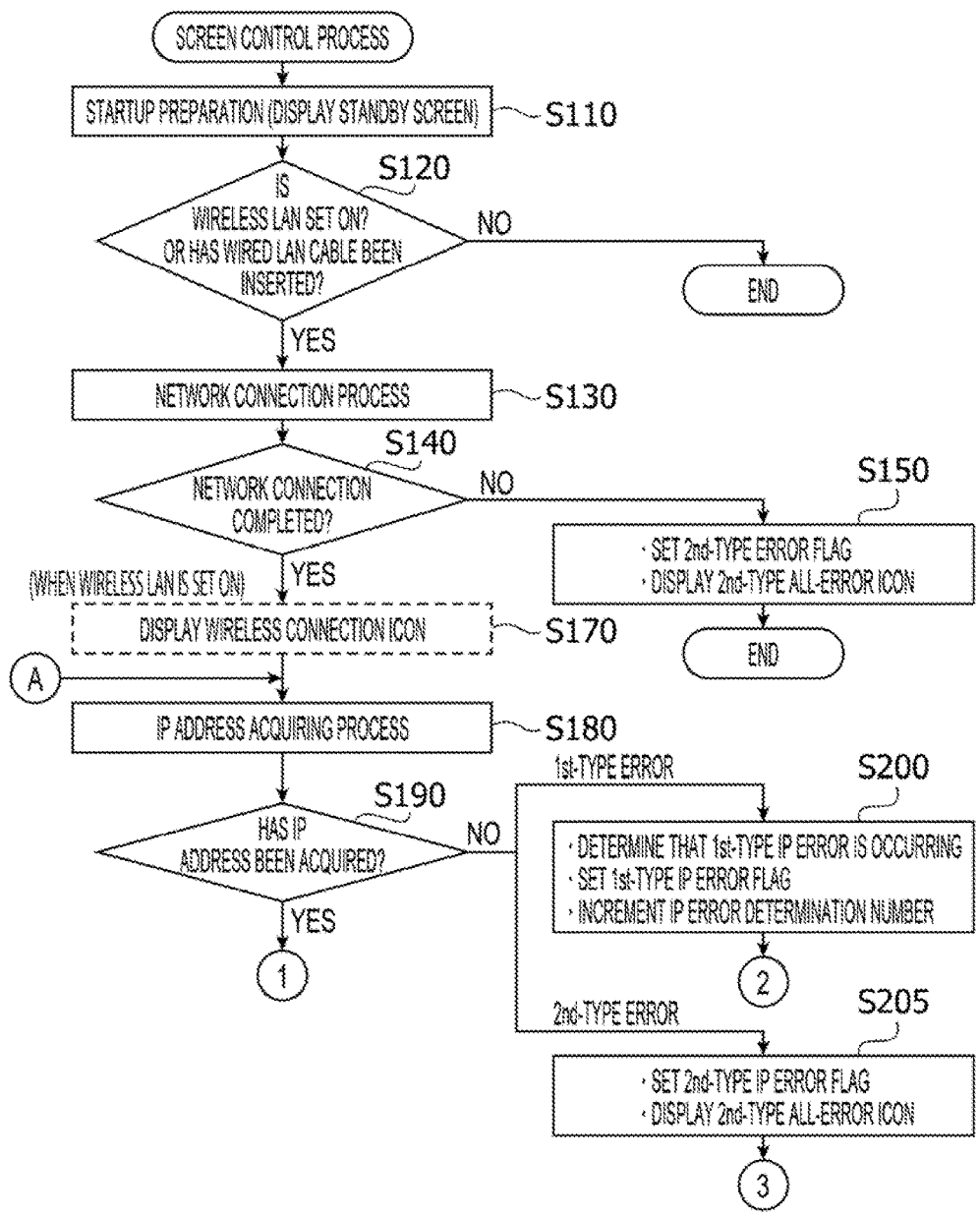
Figure 6B:
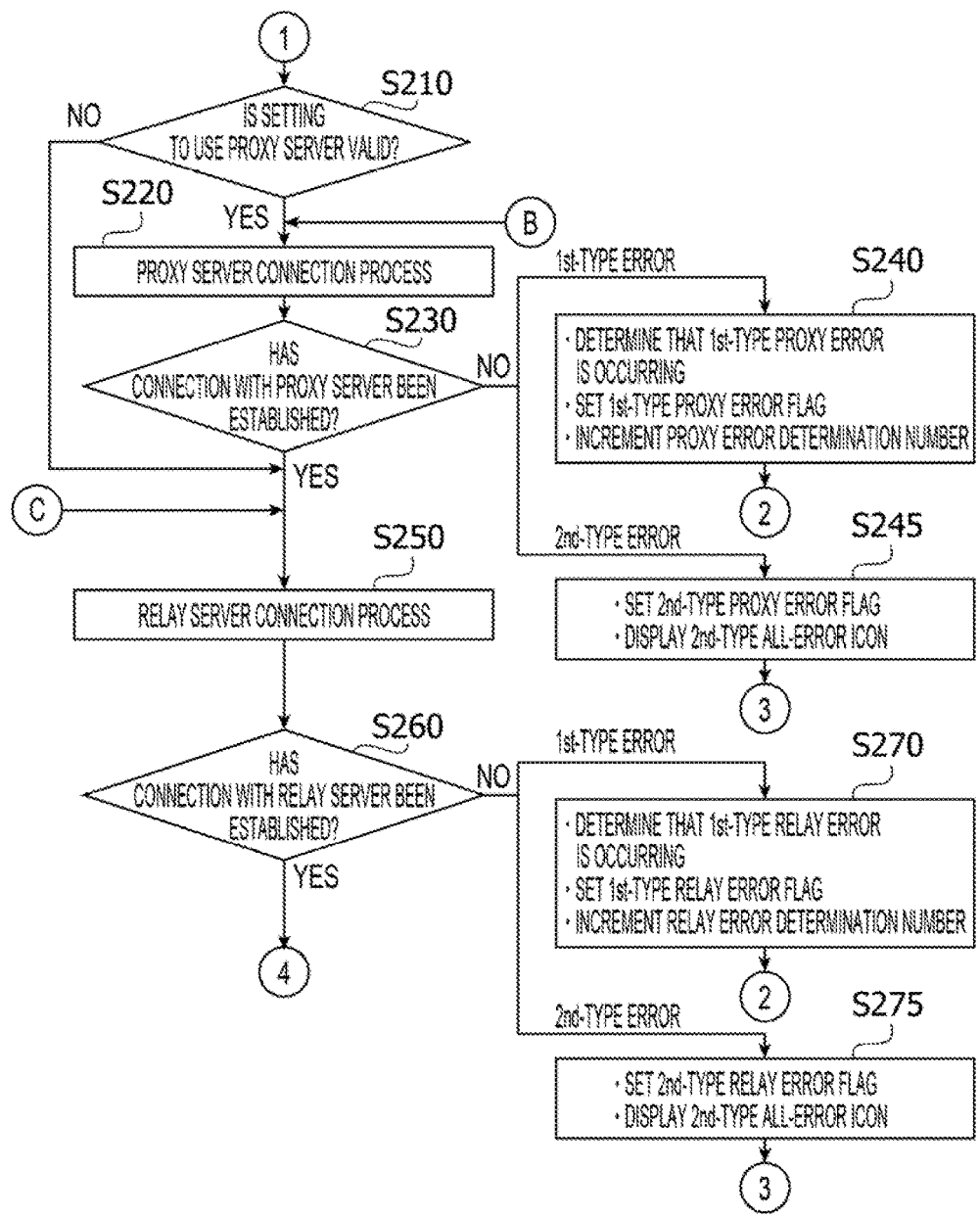
Figure 6C:
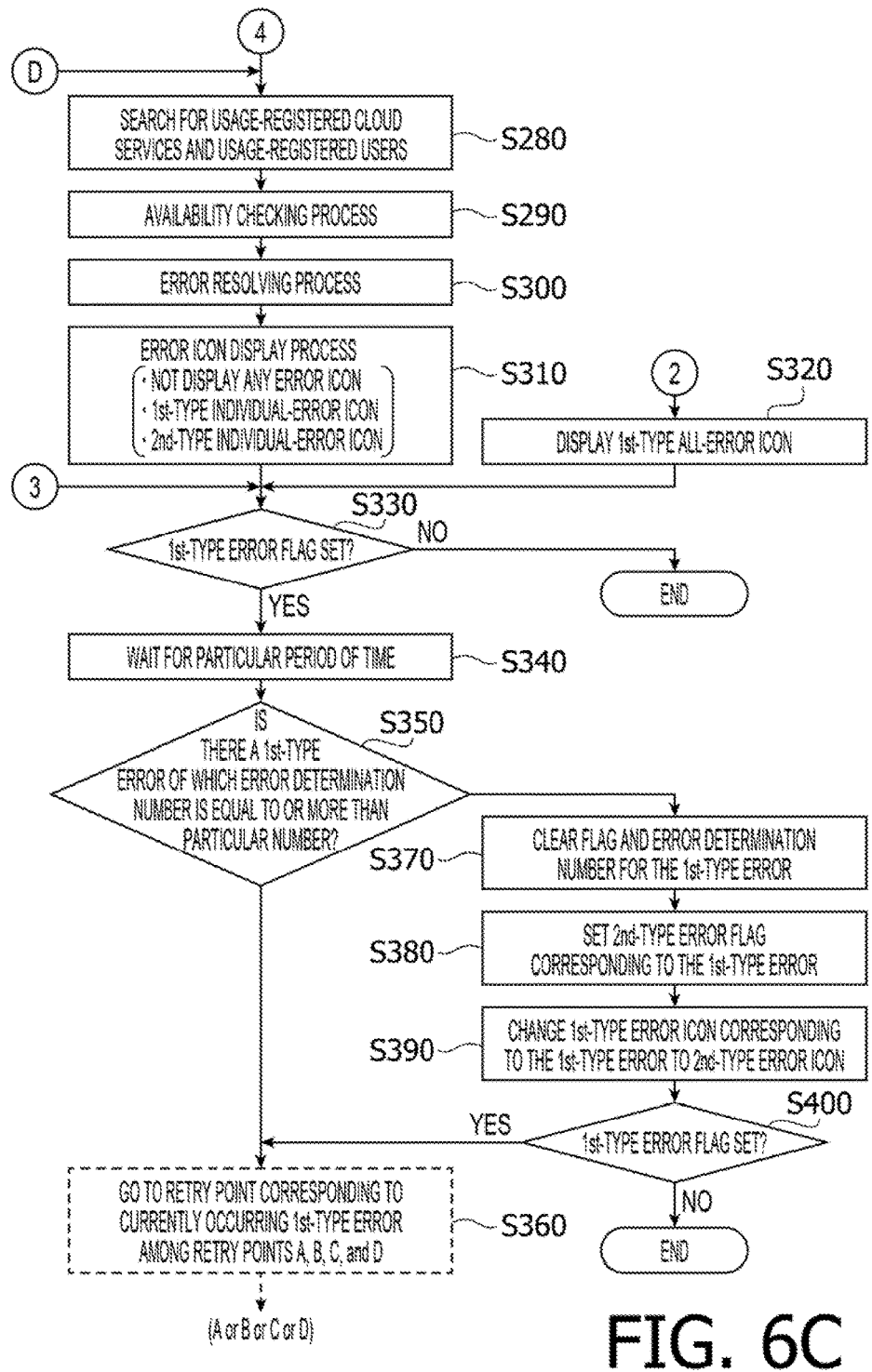

FIGS. 6A, 6B, and 6C are flowcharts showing a procedure of a screen control process in the illustrative embodiment according to one or more aspects of the present disclosure.

Figure 7:
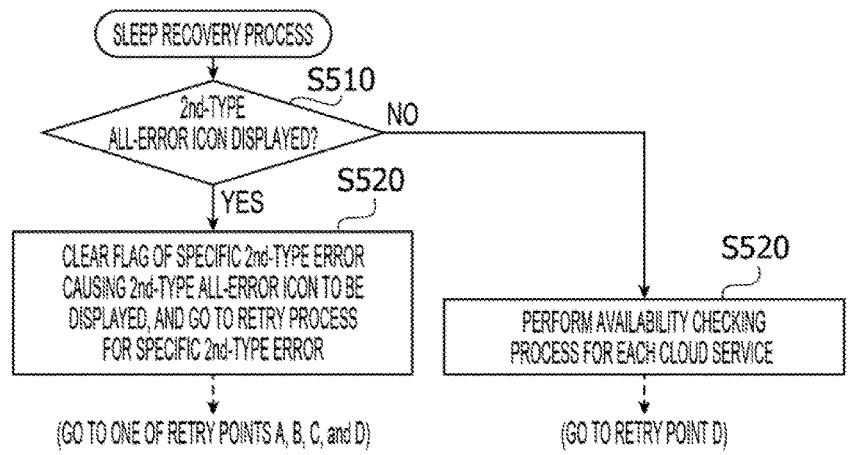

FIG. 7 is a flowchart showing a procedure of a sleep recovery process in the illustrative embodiment according to one or more aspects of the present disclosure.

Figure 8:
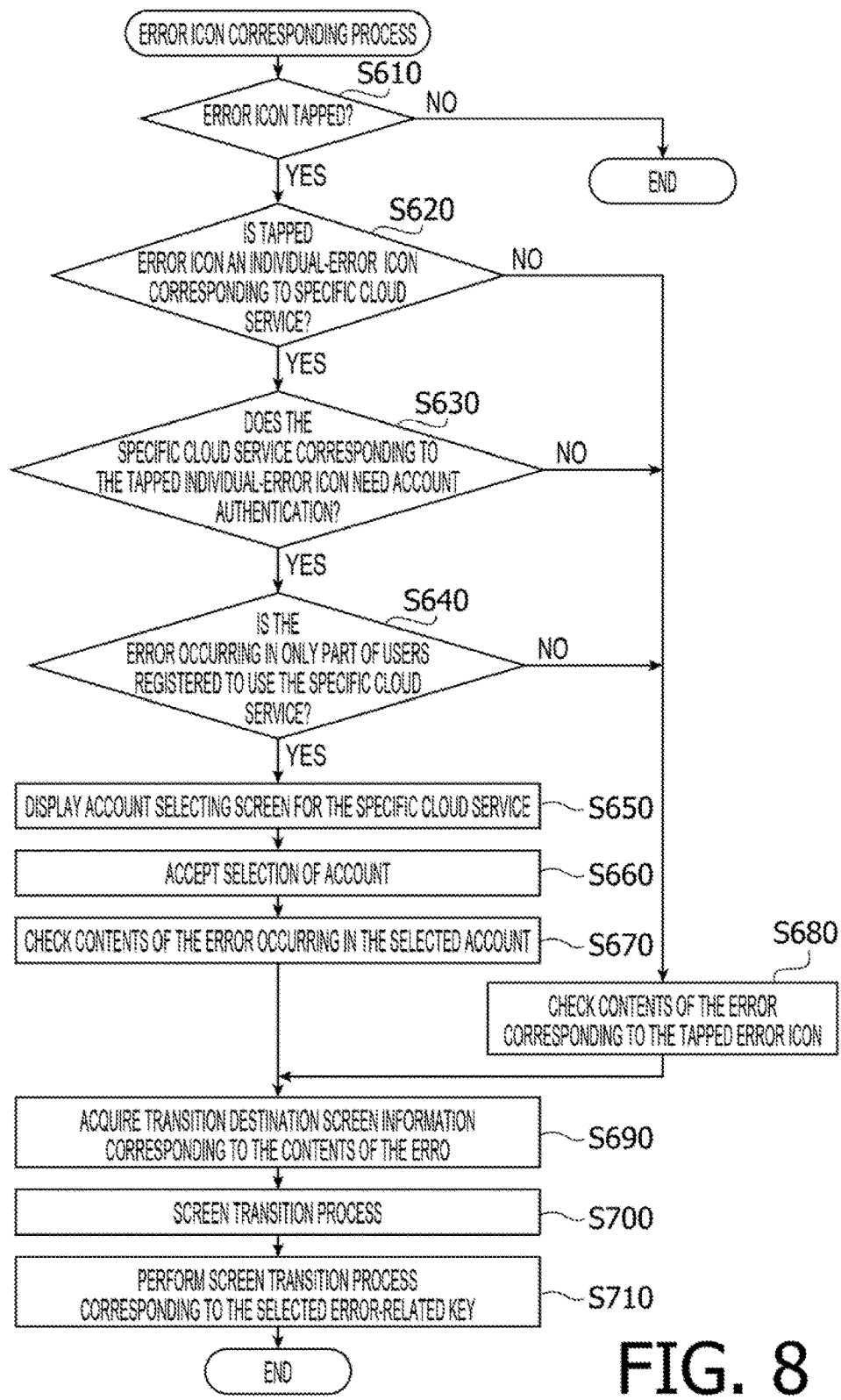

FIG. 8 is a flowchart showing a procedure of an error icon corresponding process in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings.

(1) Overview of Cloud Service System

Figure 1:
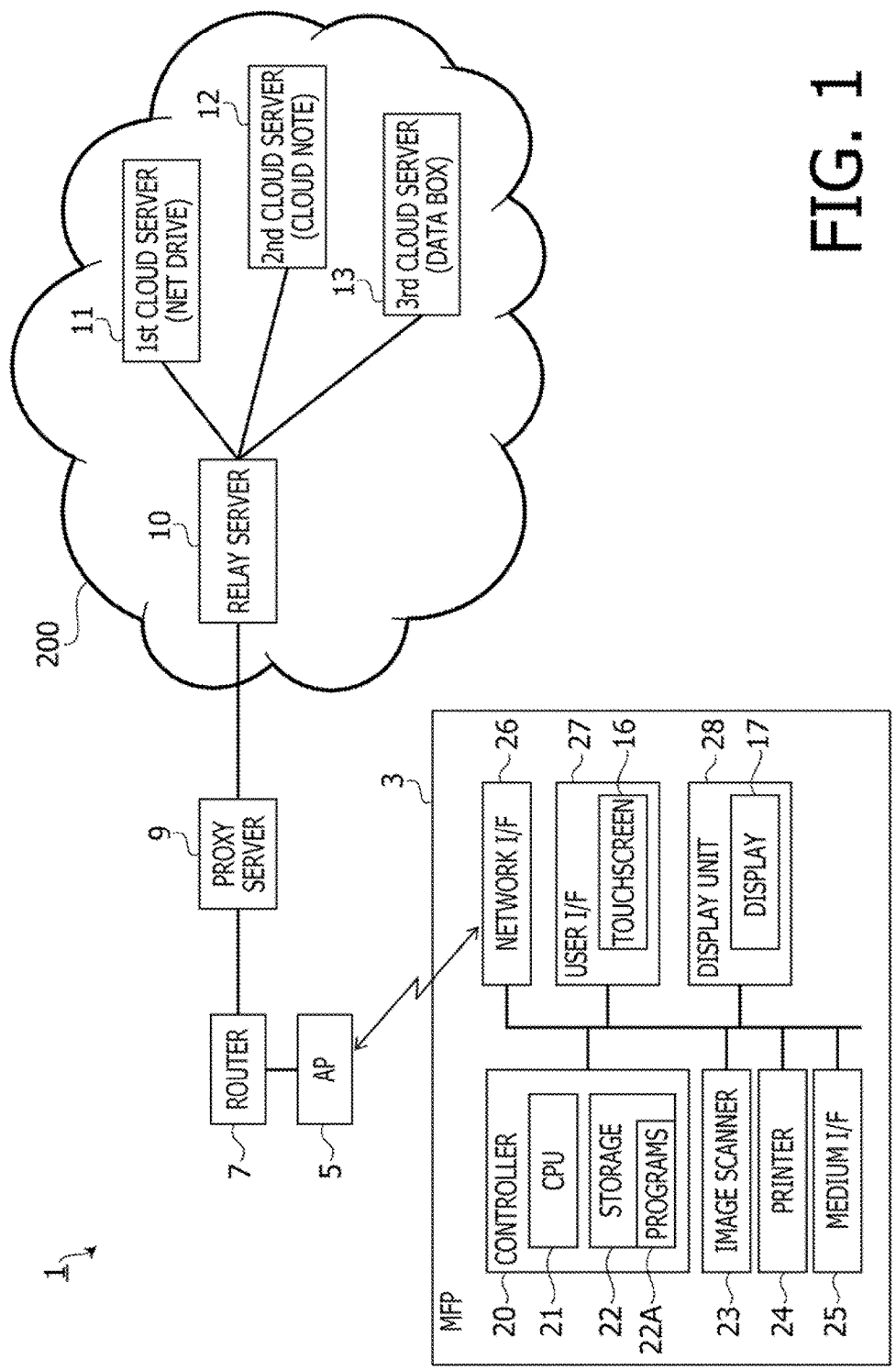
FIG. 1 is a block diagram showing a configuration of a cloud service system in an illustrative embodiment according to one or more aspects of the present disclosure.

As shown in FIG. 1, a cloud service system 1 of the illustrative embodiment includes a multi-function peripheral (hereinafter referred to as an "MFP") 3, an access point (hereinafter referred to as an "AP") 5, a router 7, a proxy server 9, a relay server 10, and a plurality of cloud servers 11, 12, and 13.

The AP 5 is a wireless relay device configured to relay data received and to be transmitted via wireless communication (hereinafter referred to as "wireless LAN communication") complying with wireless LAN standards such as IEEE802.11b/g/n/ac.

The APS is connected with an Internet 200 via the router 7 and the proxy server 9. The MFP 3 is configured to perform wireless LAN communication, and is connectable with the Internet 200 via the AP 5.

The router 7 is a known relay device configured to relay data transmitted on networks. The proxy server 9 is a known relay apparatus configured to relay accesses from a terminal device to various servers on the Internet.

The router 7 has a DHCP server function, and is configured to inform a terminal device, which has established a wireless LAN connection with the AP 5, of an IP address for the terminal device. After booted, the MFP 3 acquires an IP address from the router 7 in response to establishing a wireless LAN connection with the AP 5. After acquiring the IP address from the router 7, the MFP 3 performs wireless LAN communication using the acquired IP address. Thus, in the cloud service system 1 of the illustrative embodiment, data communication is performed in accordance with the Internet protocol using IP addresses.

The MFP 3 has a plurality of functions such as a scanning function, a copy function, a facsimile function, and a cloud function. The scanning function is a function to read an image of a document and generate image data of the document. The copy function is a function to print out an image read by the scanning function. The facsimile function is a function to transmit image data generated by the scanning function, via a facsimile line, and to print out image data received via the facsimile line.

The cloud function is a function to use cloud services provided by the cloud servers 11, 12, and 13. Specifically, the cloud function is a function to upload files to cloud servers via the Internet 200 and/or download files stored in cloud servers via the Internet 200. Nonetheless, the cloud function is not limited to the above function. What is achieved by the cloud function may be one of file uploading via the Internet 200 and file downloading via the Internet 200, or may be other functions in addition to or instead of file uploading via the Internet 200 and file downloading via the Internet 200.

On the Internet 200, a plurality of network apparatuses are interconnected, which include the relay server 10 and the cloud servers 11, 12, and 13. The MFP 3 is physically connected with the plurality of network apparatuses on the Internet 200, to be able to perform data communication with the plurality of network apparatuses on the Internet 200. Nonetheless, in the illustrative embodiment, when using cloud services, the MFP 3 performs data communication with each of the cloud servers 11, 12, and 13 via the relay server 10. Therefore, in order to upload files to one of the cloud servers 11, 12, and 13 using the cloud function in execution, the MFP 3 transmits the files directly to the relay server 10. Then, the relay server 10 uploads the files to the one of the cloud servers 11, 12, and 13. Consequently, the files are uploaded from the MFP 3 to the one of the cloud servers 11, 12, and 13.

The cloud servers 11, 12, and 13 provides their own cloud services to terminal devices on the Internet 200, respectively. Specifically, for instance, the first cloud server 11 provides a cloud service referred to as "net drive." Further, for instance, the second cloud server 12 provides a cloud service referred to as "cloud note." Moreover, for instance, the third cloud server 13 provides a cloud service referred to as "data box."

The above cloud services are different from each other with respect to their details. Nonetheless, service contents provided in common by the cloud services includes an upload service and a download service for each registered user. The upload service is a service to store files uploaded by each of the registered users. The download service is a service to download stored files to a corresponding one of the registered users. It is noted that file types of uploadable files and a maximum file capacity thereof are defined for each cloud service.

The MFP 3 includes a controller 20, an image scanner 23, a printer 24, a medium interface (hereinafter, which may be referred to as a "medium I/F") 25, a network interface (hereinafter, which may be referred to as a "network I/F") 26, a user interface (hereinafter, which may be referred to as a "user I/F") 27, and a display unit 28.

The controller 20 is configured to execute various functions (e.g., various kinds of processing) of the MFP 3. The controller 20 includes a CPU 21 and a storage 22. Specifically, the functions by the controller 20 are performed when the CPU 21 executes programs 22A stored in the storage 22.

For instance, the storage 22 includes semiconductor memories such as a ROM, a RAM, and a flash memory. The programs 22A stored in the storage 22 include programs for cloud applications that are configured to achieve the cloud function, i.e., to use the cloud services from the MFP 3. Specifically, in the illustrative embodiment, the programs 22A stored in the storage 22 include programs for a specific cloud application that are configured to individually achieve a specific cloud function corresponding to each of the cloud services provided by the cloud servers 11, 12, and 13. The specific cloud function is performed when the CPU 21 executes the specific cloud application. For instance, when the CPU 21 executes a cloud application for the cloud service "net drive," the MFP 3 is allowed to use "net drive" provided by the first cloud server 11. Further, the programs 22A stored in the storage 22 include programs for below-mentioned processes shown in FIGS. 6 to 9.

The medium I/F 25 is an interface to which various storage media are attached. The medium I/F 25 is configured to control reading of data stored in a storage medium attached to the medium I/F 25. When a non-volatile storage medium configured to rewrite data stored therein is attached to the medium I/F 25, the medium I/F 25 is allowed to control both operations of data writing and data reading on the attached storage medium. Various types of storage media such as USB memories and card-type flash memories are allowed to be attached to the medium I/F 25. The medium I/F 25 may be configured to read data from and write data into external storage media via non-contact communication.

The image scanner 23 is one of elements for achieving the scanning function. The image scanner 23 includes an image sensor. The image scanner 23 is configured to read an image of a document and generate image data representing the read image. The generated image data may be uploaded to a cloud server on a file-by-file basis (i.e., as image files), using a cloud function.

The printer 24 is one of elements for mainly achieving the copy function. The printer 24 is configured to print image data generated by the image scanner 23 using the scanning function, on various types of recording media (e.g., various sizes of printing papers, post cards, and transparent sheets). The controller 20 may acquire an image file from a storage medium attached to the medium I/F 25 and control the printer 24 to print an image represented by the acquired image file. Further, the controller may upload the image file acquired from the storage medium attached to the medium I/F 25, to a cloud server using the cloud function.

The user I/F 27 includes various input devices such as a touchscreen 16 and operable buttons (not shown). The user I/F 27 is configured to accept an input operation by a user. The display unit 28 includes a display 17 (e.g., a liquid crystal display) configured to display an image. The touchscreen 16 is superposed on a display area of the display 17.

The network I/F 26 is for performing wireless LAN communication. After booted, the controller 20 attempts to establish a wireless LAN connection with the AP 5 via the network I/F 26. Then, after the wireless LAN connection with the AP 5 has been established, the controller 20 acquires an IP address from the router 7, and further attempts to establish a connection with the proxy server 9. Afterward, the controller 20 is allowed to establish a connection with the Internet 200 via wireless LAN communication, using the acquired IP address.

In the illustrative embodiment, the relay server 10 is provided by a vendor of the MFP 3. In order to use a particular service of the services provided by servers (e.g., the servers 11, 12, and 13) on the Internet 200, the MFP 3 of the illustrative embodiment generally accesses a corresponding server via the relay server 10.

In order to use the cloud services provided by the cloud servers 11, 12, and 13, a user needs to previously register his/her account for each of the cloud services. For instance, account registration is made by transmitting to the cloud servers 11, 12, and 13 a request for registration with an account including a user ID and a password. When using a particular one of the cloud services, the registered user who has registered his/her account for the particular cloud service issues a request for login by accessing a corresponding cloud server and transmitting the account to the server. When user authentication is successfully performed based on the transmitted account, the user is permitted to log in to the corresponding cloud server and user the particular cloud service.

A plurality of users are allowed to register their accounts for each of the cloud services. Each of the registered users is allowed to individually use the cloud services. In each cloud service, an upper limit of a storable file capacity is set individually for each registered user. Each registered user is allowed to upload and store files within the upper limit.

Each user is allowed to register his/her account for an intended cloud service by accessing a corresponding cloud server from terminal devices (e.g., personal computers and smartphones) connectable with the Internet 200. Then, each registered user is allowed to use the account-registered cloud service from the terminal devices connectable with the Internet 200.

Meanwhile, in order to make the account-registered cloud service available from the MFP 3 using the cloud function of the MFP 3, the account registered for the cloud service needs to be registered with the relay server 10 and the MFP 3. It is noted that, hereinafter, registration of an account with the relay server 10 and the MFP 3 may be referred to as "usage registration."

It is possible to perform "usage registration," e.g., by sending to the relay server 10 account information (e.g., an user ID and a password) with a specific cloud service designated for the user registration and inputting on the MFP 3 the account information with the specific cloud service designated for the user registration.

It is possible to perform the usage registration with the relay server 10 by accessing the relay server 10 from terminal devices (e.g., personal computers and smartphones) connectable with the Internet 200. It is noted that the usage registration with the relay server 10 may be performed by accessing the relay server 10 from the MFP 3.

The relay server 10 stores therein a usage-registered user list for each available cloud service (i.e., for each cloud application). The usage-registered user list stored in the relay server 10 contains account information of usage-registered users who have performed the "usage registration" for a corresponding cloud service and are permitted to use the corresponding cloud service from the MFP 3. The account information of the usage-registered users that is stored in the relay server 10 may include user IDs and passwords. Hereinafter, the account information of the usage-registered users that is stored in the relay server 10 may be referred to as "relay account information."

The MFP 3 stores therein a usage-registered user list for each available cloud service (i.e., for each cloud application). The usage-registered user list stored in the MFP 3 contains account information of the usage-registered users who are permitted to use a corresponding cloud service from the MFP 3. The account information of the usage-registered users that is stored in the MFP 3 may include user IDs. Hereinafter, the account information of the usage-registered users that is stored in the MFP 3 may be referred to as "terminal-side account information."

By performing the usage registration for each cloud service with the relay server 10 and the MFP 3, in the rely server 10, the relay account information of the usage-registered users is added onto the usage-registered user list for each cloud service. Further, in the MFP 3, the terminal-side account information of the usage-registered users is added onto the usage-registered user list for each cloud service.

After the usage registration is performed for a cloud service, it is possible to use the usage-registered cloud service from the MFP 3 using a usage-registered account.

(2) Regular Procedure when Cloud Application is Executed

Subsequently, referring to FIGS. 2A and 2B, an explanation will be provided of a regular procedure when a cloud application is used from the MFP 3. After booted, the controller 20 of the MFP 3 performs a predetermined startup preparation including various initializing processes, and thereafter, controls the display 17 to display a standby screen 40 shown in FIG. 2A.

On the standby screen 40, function selecting keys (e.g., keys 41, 42, and 43) associated with respective different functions are displayed to prompt the user to select an intended function that the user wishes to execute from among functions executable by the controller 20. FIG. 2A shows an example in which a facsimile key 41 for executing the facsimile function, a copy key 42 for executing the copy function, and a scanning key 43 for executing the scanning function are displayed as the function selecting keys.

It is noted that the MFP 3 has various functions other than the aforementioned three functions. Therefore, the standby screen includes a plurality of pages that are switchable to enable a selection from among the other functions. Namely, when a second switching key 49 is tapped on the standby screen 40 (hereinafter, which may be referred to as a "first standby screen 40") with a first page displayed thereon, the first standby screen 40 is switched to a second standby screen 50 with a second page displayed thereon. It is noted that the first page includes the facsimile key 41. Further, the second page includes a digital camera print key 51, a cloud key 52, and a useful tool key 53.

The digital camera print key 51 is for executing a digital camera print function. The cloud key 52 is for executing the cloud function. The useful tool key 53 is for executing a useful tool function. Detailed explanations will be omitted of the digital camera print function and the useful tool function.

When the second switching key 49 is tapped on the second standby screen 50, the second standby screen 50 is switched to a third standby screen (not shown) with a third page displayed thereon. It is noted that the third page may include at least one function key different from the aforementioned function keys. When a first switching key 48 is tapped on the second standby screen 50, the second standby screen 50 is switched to the first standby screen 40. When the first switching key 48 is tapped on the first standby screen 40, the first standby screen 40 is switched to the third standby screen.

On each standby screen, a menu key 45 and an ink key 46 are displayed at an upper right area of the screen. When the menu key 45 is tapped, a menu screen (not shown) for configuring various settings for the MFP 3 is displayed. When the ink key 46 is tapped, a particular ink menu is displayed. The ink key 46 also functions as an information image that indicates a remaining ink amount of ink.

Further, after the controller 20 is booted, when wireless LAN communication with the AP 5 is established via the network I/F 26, and the MFP 3 is brought into a state where the MFP 3 is allowed to perform wireless LAN communication with the AP 5, a wireless connection icon 47 is displayed in an area adjacent to the ink key 46. As the wireless connection icon 47 is displayed, the user is allowed to realize that a wireless LAN connection with the AP 5 is established. The wireless connection icon 47 also functions as an information image that indicates an intensity of a radio wave received from the AP 5.

When a function selecting key is tapped on one of the standby screens, the standby screen is switched to a screen for executing a function corresponding to the tapped key. For instance, when the cloud key 52 is tapped on the second standby screen 50, the second standby screen 50 is switched to a cloud application selecting screen 55.

On the cloud application selecting screen 55, application selecting keys 56, 57, and 58 associated with respective cloud applications are displayed. Specifically, each of the application selecting keys 56, 57, and 58 is configured to prompt the user to select a corresponding cloud application that the user wishes to execute among a plurality of cloud applications executable by the controller 20. On the cloud application selecting screen 55 exemplified in FIG. 2A, a net drive key 56, a cloud note key 57, and a data box key 58 are displayed as the application selecting keys. The net drive key 56 is for executing a net drive application. The net drive application is a cloud application for using the "net drive." The cloud note key 57 is for executing a cloud note application. The cloud note application is a cloud application for using the "cloud note." The data box key 58 is for executing a data box application. The data box application is a cloud application for using the "data box."

Figure 2A:
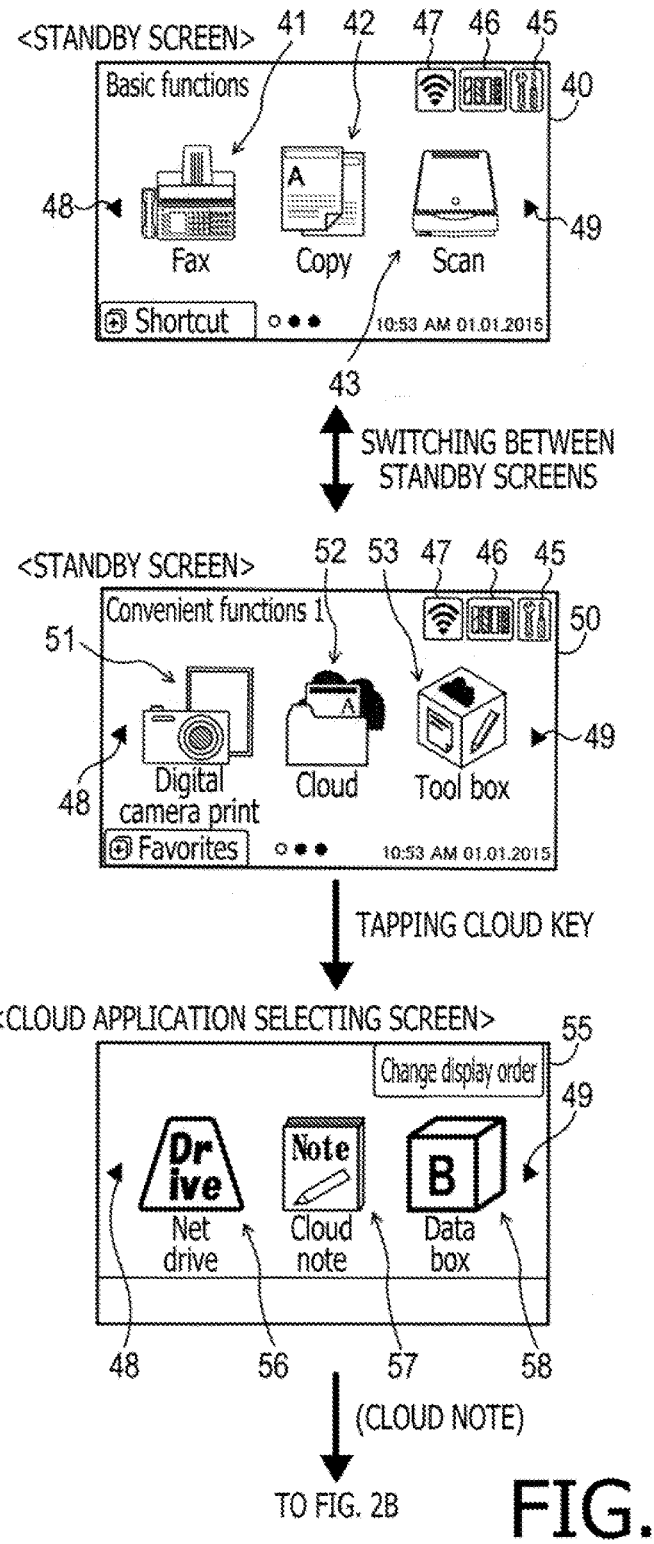
FIGS. 2A and 2B are illustrations exemplifying screen transitions to be made when a cloud application is used, in the illustrative embodiment according to one or more aspects of the present disclosure.
Figure 2B:
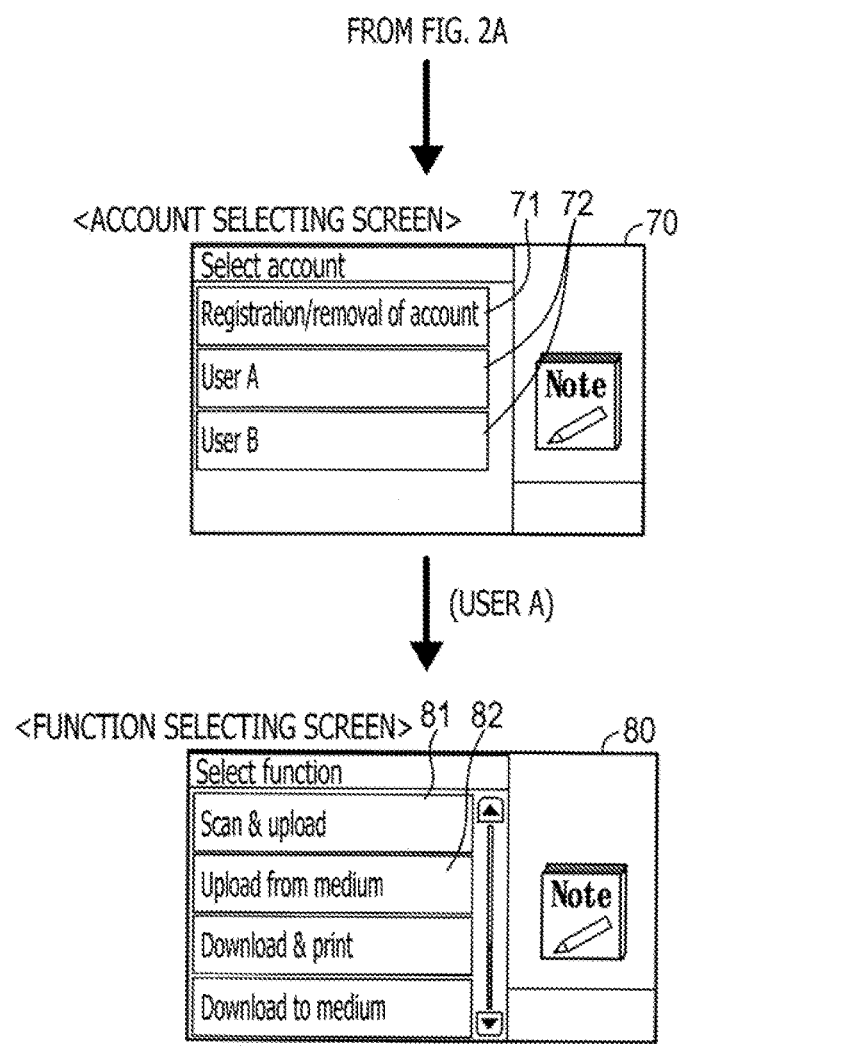

When there are three more cloud applications executable by the controller 20 other than the aforementioned cloud applications, it is possible to switch the cloud application selecting screen 55 to another cloud application selecting screen by tapping the first switching key 48 or the second switching key 49 on the cloud application selecting screen 55 exemplified in FIG. 2A. On the other cloud application selecting screen, application selecting keys for respective cloud applications other than the aforementioned cloud applications are displayed.

When one of the three application selecting keys 56, 57, and 58 is tapped on the cloud application selecting screen 55 exemplified in FIG. 2A, a cloud function based on a cloud application corresponding to the tapped application selecting key is performed.

For instance, when the cloud note key 57 is tapped, the controller 20 executes the cloud note application. Specifically, the controller 20 displays an account selecting screen 70. On the account selecting screen 70, a list of the terminal-side account information (e.g., user IDs) of the usage-registered users for the cloud note is displayed. Further, on the account selecting screen 70, an account setting key 71 and a plurality of usage-registered-user keys 72 are displayed. The account setting key 71 is for adding a new usage registration for the cloud note onto the MFP 3 or deleting a usage registration for the cloud note from the MFP 3. When the account setting key 71 is tapped, a screen transition is made from the account selecting screen 70 to a screen for adding or deleting a usage registration for the cloud note.

Each of the usage-registered-user keys 72 is individually displayed in association with a corresponding one of the users usage-registered for the cloud note. On each usage-registered-user key 72, the terminal-side account information of a corresponding usage-registered user is displayed. FIG. 2B exemplifies the account selecting screen 70 in a case where the users usage-registered for the cloud note on the MFP 3 include a user having a user ID "User A" and a user having a user ID "User B."

When one of the usage-registered-user keys 72 is tapped on the account selecting screen 70, the cloud note application transmits a cloud note connection request to the relay server 10. The cloud note connection request includes terminal-side account information corresponding to the tapped usage-registered-user key 72.

In response to receiving the cloud note connection request from the cloud note application on the MFP 3, the relay server 10 acquires relay account information, which is coincident with the terminal-side account information included in the received cloud note connection request, from the list of the users usage-registered for the cloud note. Then, the relay server 10 issues a request for login to the cloud note by transmitting the acquired relay account information to the second cloud server 12 that provides the cloud note.

When the login is accomplished in response to the second cloud server 12 successfully performing authentication using the relay account information, the second cloud server 12 transmits to the relay server 10 an authentication completion notification and service usage information corresponding to the relay account information. Thereby, the relay server 10 recognizes that a usage-registered user corresponding to the relay account information has successfully logged in to the cloud note, and transmits the authentication completion notification and the service usage information. It is noted that, for instance, the service usage information includes kinds of services usable by the user corresponding to the account used for the successful login, an upper limit of an uploadable file capacity, and a current remaining amount of the uploadable file capacity.

In response to receiving the authentication completion notification and the service usage information from the relay server 10, the cloud note application on the MFP 3 displays a function selecting screen 80 corresponding to the account used for the login, based on the service usage information. The login user corresponding to the account used for the login is allowed to use the cloud note with the function selecting screen 80 as a starting point.

Specifically, when a scan upload key 81 is tapped, the cloud note application causes the image scanner 23 to scan an image of a document. Then, the cloud note application uploads an image file of the scanned image to the second cloud server 12. It is noted that the uploading is indirectly performed via the relay server 10. Thereby, the uploaded image file is stored into a storage area allocated to the login user in the second cloud server 12.

When files of a capacity close to the upper limit of the uploadable file capacity have already been uploaded, and the remaining capacity is not enough to upload a new file, for instance, as exemplified in a below-mentioned function selecting screen 80 in FIG. 5B, a second-type error mark 86 is displayed on the scan upload key 81. The second-type error mark 86 represents that the corresponding function is currently unavailable by some cause and that some procedure (e.g., securing a necessary capacity by deleting unnecessary files) is required to resolve the unavailable condition.

Further, by tapping a medium upload key 82, it is possible to select a file from a storage medium attached to the medium I/F 25 and upload the selected file to the cloud note.

Furthermore, on the function selecting screen 80, keys for selecting respective functions available in the cloud note are displayed as well as the scan upload key 81 and the medium upload key 82.

(3) Error Icons to be Displayed on Standby Screens

In the illustrative embodiment, the MFP 3, which has a basic configuration as described above, has the following characteristic configuration. When booted, the controller 20 checks, individually for each cloud application which at least one account is registered to use, whether the cloud function by each cloud application is in an executable state, i.e., the cloud service by each cloud application is in an available condition. The checking is performed individually for each cloud application which at least one account is registered to use, and individually for each usage-registered user. Then, when there is an unavailable cloud service, an error icon indicating the unavailable cloud service is displayed on a standby screen.

It is noted that, in known MFPs, even if all cloud services are unavailable, or one or more specific cloud services are unavailable, a user is unable to be aware of it from standby screens. In the known MFPs, even if a specific cloud service is unavailable, the user is not allowed to realize it until the user performs at least tapping the cloud key 52 on the second standby screen 50 to display the cloud application selecting screen 55 and further selecting the corresponding cloud application on the cloud application selecting screen 55.

In contrast, according to the illustrative embodiment, the MFP 3 checks whether each usage-registered cloud service is currently available. Further, when there is a currently unavailable usage-registered cloud service, an error icon indicating the unavailable cloud service is displayed on a standby screen. Therefore, the user of the MFP 3 is allowed to know whether each usage-registered cloud service is available in a state where the standby screen is displayed after the MFP 3 is booted. For instance, as exemplified in FIGS. 3A to 3D, the error icon may be displayed in an area left adjacent to a display area of the wireless connection icon 47.

There are various causes for an error state where a specific cloud service is unable to be used from the MFP 3. First, various types of the error state are roughly classified into two specific types, i.e., a first-type error and a second-type error. The first-type error is likely to be naturally resolved after a lapse of time. The second-type error is not naturally resolved after a lapse of time, but is resolved by some procedure.

(3-1) First-Type Error

More specifically, the first-type error may include a plurality of kinds of errors. For instance, as an example of the first-type error, a state may be assumed in which the MFP 3 has not yet acquired an IP address from the router 7 even after the MFP 3 has been booted and established a wireless LAN connection with the AP 5. In this exemplified case, the MFP 3 is not allowed to use networks. Therefore, all of the cloud services are unavailable from the MFP 3. Nonetheless, since the unavailable condition in the exemplified case is caused by that the MFP 3 has not yet acquired an IP address, the unavailable condition is highly likely to be resolved when the MFP 3 successfully acquires an IP address while the user is waiting for some period of time.

Figure 3A:
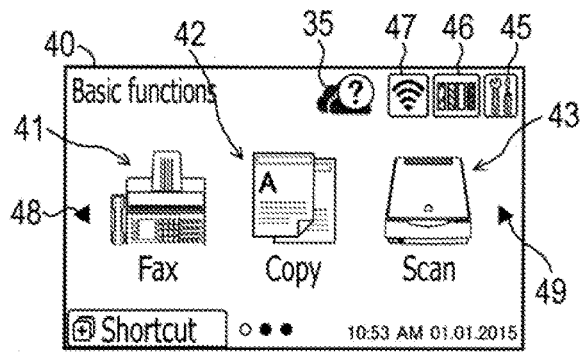

Thus, when all of the cloud services are temporarily unavailable from the MFP 3 at the present time, but all of the cloud service are highly likely to become normally available within some period of time, the controller 20 displays a first-type all-error icon 35 on the standby screen 40, as exemplified in FIG. 3A. Even though the page of the standby screen is switched to another page, the first-type all-error icon 35 stays displayed similarly until the state where all of the cloud services are unavailable is resolved.

The first-type all-error icon 35 is formed by superimposing a first-type error mark on a cloud-shaped image. The first-type error mark is an image of a question mark surrounded by a circle.

By looking at the standby screen 40 to be displayed in a while after the MFP 3 is booted, the user of the MFP 3 is allowed to quickly recognize whether each cloud service is available. When there is no error icon displayed in the area left adjacent to the wireless connection icon 47, the user is allowed to recognize that all of the usage-registered cloud services are available. Meanwhile, when the first-type all-error icon 35 as shown in FIG. 3A is displayed on the standby screen 40, the user is allowed to recognize that all of the cloud services are unavailable from the MFP 3 by some cause and that the unavailable condition is highly likely to be resolved in some period of time.

Further, the following state may be cited as an example of the first-type error. That is, it may be assumed that the MFP 3 has established a wireless LAN connection with the AP 5 and has acquired an IP address, but has not yet established a connection with the proxy server 9 (i.e., authentication by the proxy server 9 has not been successfully completed).

In this exemplified case, all of the cloud services are unavailable from the MFP 3. Nonetheless, since the unavailable condition in the exemplified case is caused by that the authentication by the proxy server 9 has not been completed, the unavailable condition is highly likely to be resolved when the authentication by the proxy server 9 is successfully achieved while the user is waiting for some period of time. In this case, the controller 20 displays the first-type all-error icon 35 as exemplified in FIG. 3A, on the standby screen 40.

Further, the following state may be cited as an example of the first-type error. That is, it may be assumed that the MFP 3 has established a wireless LAN connection with the AP 5, has acquired an IP address, and has established a connection with the proxy server 9, but the MFP 3 is not allowed to perform data communication with each cloud server via the relay server 10 since the MFP 3 has not yet established a connection with the relay server 10.

In this exemplified case as well, all of the cloud services are unavailable from the MFP 3. Nonetheless, since the unavailable condition in the exemplified case is caused by that the MFP 3 has not yet established a connection with the relay server 10, the unavailable condition is highly likely to be resolved when the MFP 3 successfully establishes a connection with the relay server 10 while the user is waiting for some period of time. In the exemplified case as well, the controller 20 displays the first-type all-error icon 35 as exemplified in FIG. 3A, on the standby screen 40.

Further, the following state may be cited as an example of the first-type error. That is, it may be assumed that the MFP 3 has normally established a connection with the relay server 10, but a specific cloud service provided by a specific cloud server is temporarily unavailable by some temporary cause on the side of the specific cloud server. For instance, a state may be assumed in which access to the specific cloud server is temporarily concentrated, and a connection with the specific cloud server may not be normally established until some period of time elapses.

Accordingly, after booted, the controller 20 sequentially performs establishing a wireless LAN connection with the AP 5, acquiring an IP address, establishing a connection with the proxy server 9, establishing a connection with the relay server 10, and thereafter, further checking, for each usage-registered account with respect to each usage-registered cloud service, whether a user of each individual account is allowed to use each individual cloud service. The checking is indirectly performed via the relay server 10.

Figure 3B:
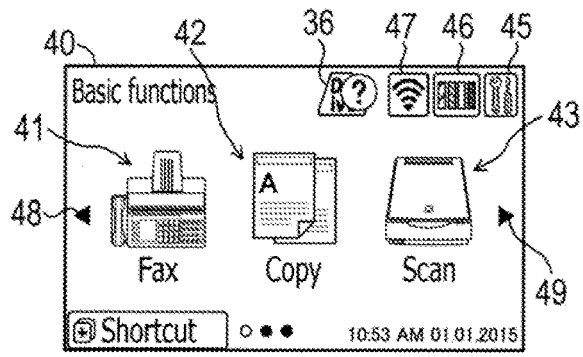

As a result of the checking, when there is a usage-registered cloud service in which some kind of the first-type error is caused, as exemplified in FIG. 3B, the controller 20 displays a first-type individual-error icon 36 on a standby screen, as exemplified in FIG. 3B. For instance, the first-type individual-error icon 36 exemplified in FIG. 3B represents that the net drive is temporarily unavailable from the MFP 3 since the first-type error is occurring in the first cloud server 11 providing the net drive. Even though the page of the standby screen is switched to another page, the first-type individual-error icon 36 stays displayed similarly until a specific cloud service in which the first-type error is occurring becomes available in response to the first-type error being resolved.

As exemplified in FIG. 3B, the first-type individual-error icon 36 is formed by superimposing the first-type error mark on an image representing a specific cloud service in which the first-type error is occurring.

When the first-type individual-error icon 36 as shown in FIG. 3B is displayed on the standby screen 40 displayed after the MFP 3 is booted, the user of the MFP 3 is allowed to recognize that a specific cloud service is only unavailable from the MFP 3 by some cause and that the unavailable condition is highly likely to be naturally resolved in some period of time.

Thus, as exemplified above, the first-type error includes a plurality of kinds of errors. Among the plurality of kinds of first-type errors, particularly, a first-type error caused when the MFP 3 has not acquired an IP address may be referred to as a "first-type IP error." Additionally, a first-type error caused when the MFP 3 has not established a connection with the proxy server 9 (i.e., authentication by the proxy server 9 has not been successfully completed) may be referred to as a "first-type proxy error." Further, a first-type error caused when the MFP 3 has not established a connection with the relay server 10 may be referred to as a "first-type relay error." When at least one of the three kinds of first-type errors occurs, the first-type all-error icon 35 is displayed on the standby screen.

Further, among the plurality of kinds of first-type errors, particularly, a first-type error occurring in a specific cloud service may be referred to as a "first-type individual-error." The first-type individual-error may occur individually in any of cloud services in which errors are occurring. Further, the first-type individual-error may occur only in a specific one of accounts registered to use a specific cloud service as well as it may occur in the whole of the specific cloud service. When the first-type individual-error occurs, the first-type individual-error icon 36 is displayed on the standby screen.

(3-2) Second-Type Error

More specifically, the second-type error may include a plurality of kinds of errors. For instance, as an example of the second-type error, a state may be assumed in which the MFP 3 is not allowed to acquire an IP address from the router 7 since the MFP 3 is unable to establish a connection with the router 7 even after the MFP 3 has been booted and established a wireless LAN connection with the AP 5. It is also assumed that this exemplified state would be unable to be naturally resolved even though the state is left as is (without any procedure to settle the state) for some period of time. In this case, there is a need for some procedure to acquire an IP address from the router 7, e.g., by checking the state of the connection with the router 7 and/or checking an operational state of the router 7.

Further, for instance, as an example of the second-type error, a state may be assumed in which the MFP 3 is not allowed to establish a connection with the Internet 200 via the proxy server 9 since authentication by the proxy server 9 is unsuccessful, settings for the proxy server 9 are not adequately configured in the MFP 3, or the MFP 3 is not physically connected with the proxy server 9 even after the MFP 3 has acquired an IP address from the router 7. It is also assumed that this exemplified state would be unable to be naturally resolved even though the state is left as is (without any procedure to settle the state) for some period of time. In this case, there is a need for some procedure to make the authentication by the proxy server 9 successful, e.g., by checking the state of the connection with the proxy server 9 and/or checking setting values for the proxy server 9 in the MFP 3.

Further, for instance, as an example of the second-type error, a state may be assumed in which the MFP 3 is not allowed to perform data communication with other network devices via the relay server 10. It is also assumed that this exemplified state would be unable to be naturally resolved even though the state is left as is (without any procedure to settle the state) for some period of time. In this case, there is a need for some procedure to make the MFP 3 normally perform data communication with the relay server 10.

In the aforementioned examples of the second-type error, all of the cloud services are unavailable from the MFP 3, and this unavailable condition is less likely to be naturally resolved even though the state is left as is (without any procedure to settle the state) for some period of time. Thus, in the aforementioned examples, there is a need for some procedure to resolve the unavailable condition.

Figure 3C:
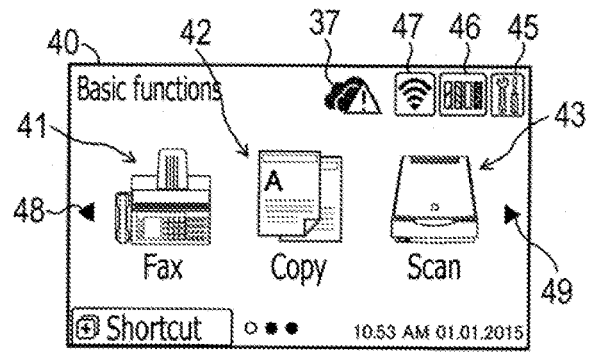

In such an unavailable condition, as exemplified in FIG. 3C, the controller 20 displays a second-type all-error icon 37 on the standby screen 40. Even though the page of the standby screen is switched to another page, the second-type all-error icon 37 stays displayed similarly until the state where all of the cloud services are unavailable is resolved.

As exemplified in FIG. 3C, the second-type all-error icon 37 is formed by superimposing a second-type error mark on a cloud-shaped image. The second-type error mark is an image of an exclamation mark surrounded by a triangle.

When the second-type all-error icon 37 as shown in FIG. 3C is displayed on the standby screen 40 displayed after the MFP 3 is booted, the user of the MFP 3 is allowed to recognize that all of the cloud services are unavailable from the MFP 3 by some cause and that there is a need for some procedure to resolve this unavailable condition.

Further, for instance, as an example of the second-type error, a state may be assumed in which due to malfunction of a specific cloud server, a cloud service provided by the specific cloud server is unavailable. It is also assumed that the malfunction would be unable to be resolved without a treatment at the side of the specific cloud server.

Figure 3D:
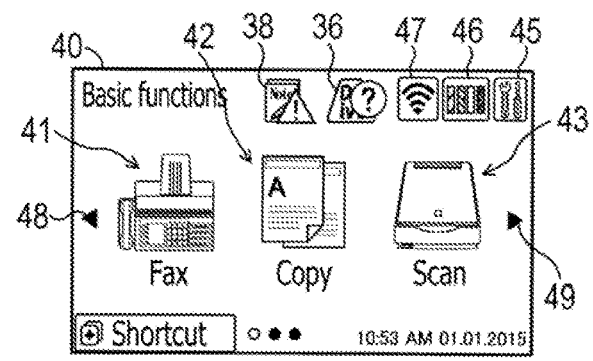

When realizing the above unavailable condition via the relay server 10, the controller 20 displays a second-type individual-error icon 38 on the standby screen 40, as exemplified in FIG. 3D. For instance, the second-type individual-error icon 38 exemplified in FIG. 3D represents that since a second-type error is occurring in the second cloud server 12 that provides the cloud note, the cloud note is unavailable from the MFP 3. Even though the page of the standby screen is switched to another page, the second-type individual-error icon 38 stays displayed similarly until a factor causing the second-type error in a specific cloud service is eliminated such that the specific cloud service is available.

As exemplified in FIG. 3D, the second-type individual-error icon 38 is formed by superimposing the second-type error mark on an image indicating a specific cloud service in which the second-type error is occurring. When the second-type individual-error icon 38 as shown in FIG. 3D is displayed on the standby screen 40 displayed after the MFP 3 is booted, the user of the MFP 3 is allowed to recognize that a specific cloud service is only unavailable from the MFP 3 by some cause and that the unavailable condition would be maintained until some procedure to resolve the state is performed.

Further, for instance, as an example of the second-type error, a state may be assumed in which as files of a capacity close to the upper limit of the uploadable file capacity have already been uploaded at the present time, there is not a remaining capacity enough to upload a new file.

When the above state is occurring in the cloud note, in response to realizing the state via the relay server 10, the controller 20 displays the second-type individual-error icon 38 as shown in FIG. 3D, on the standby screen.

Thus, as exemplified above, the second-type error includes a plurality of kinds of errors. Among the plurality of kinds of second-type errors, particularly, a second-type error caused when the MFP 3 is not allowed to acquire an IP address may be referred to as a "second-type IP error." Additionally, a second-type error caused when the MFP 3 is not allowed to normally establish a connection with the proxy server 9 may be referred to as a "second-type proxy error." Further, a second-type error caused when the MFP 3 is not allowed to normally establish a connection with the relay server 10 may be referred to as a "second-type relay error." When at least one of the three kinds of second-type errors occurs, the second-type all-error icon 37 is displayed on the standby screen.

Further, among the plurality of kinds of second-type errors, particularly, a second-type error occurring in a specific cloud service may be referred to as a "second-type individual-error." The second-type individual-error may occur individually in any of cloud services in which errors are occurring. Further, the second-type individual-error may occur only in a specific one of accounts registered to use a specific cloud service as well as it may occur in the whole of the specific cloud service. When the second-type individual-error occurs, the second-type individual-error icon 38 is displayed on the standby screen.

Further, as an example of situations where one or more cloud services are unavailable, a situation may be assumed in which a plurality of particular cloud services are unavailable by some causes, respectively, and the other cloud services are available. In this situation, a plurality of different error icons are displayed on a standby screen, each of which is associated with a corresponding one of the unavailable cloud services.

Various methods are considered as specific methods for displaying the plurality of error icons on the standby screen. For instance, the plurality of error icons may be concurrently displayed side by side. Alternatively, the plurality of error icons may be displayed one by one in a sequentially-switched manner at intervals of a particular period of time.

FIG. 3D shows an example in which the first-type individual-error icon 36 directed to the net drive and the second-type individual-error icon 38 directed to the cloud note are concurrently displayed on the standby screen 40. In other words, FIG. 3D shows an example in which the net drive is unavailable by the first-type error, and the cloud note is unavailable by the second-type error.

(4) Screen Transition by Tapping Error Icon

Subsequently, an explanation will be provided of examples of a screen transition when an error icon is tapped on a standby screen.

For instance, when the first-type all-error icon 35 is tapped in a state where the first-type all-error icon 35 is displayed on the standby screen 40 as shown in FIG. 3A, a situation informing screen (not shown) is displayed. The situation informing screen includes information about a factor causing the first-type all-error icon 35 to be displayed.

For instance, when the first-type IP error is caused by that an IP address has not been acquired, the situation informing screen displays thereon a message indicating that an IP address has not been acquired. Further, for instance, when the first-type relay error is caused by that a connection with the relay server 10 has not been established, the situation informing screen displays thereon a message indicating that the MFP 3 is in the process of establishing a connection with the relay server 10.

Subsequently, when the first-type individual-error icon 36 is tapped in a state where the first-type individual-error icon 36 directed to the net drive is displayed on the standby screen 40 as shown in FIG. 3B, a situation informing screen (not shown) is displayed. The situation informing screen includes information about a factor causing the first-type individual-error icon 36 to be displayed.

For instance, when the first-type individual-error is caused by that since accesses are temporarily concentrated on the first cloud server 11 that provides the net drive, it is difficult to establish a connection with the first cloud server 11, the situation informing screen displays thereon a message indicating that accesses are temporarily concentrated on the net drive.

Next, when the second-type all-error icon 37 is tapped in a state where the second-type all-error icon 37 is displayed on the standby screen 40 as shown in FIG. 3C, a screen is displayed that includes information about a factor causing the second-type all-error icon 37 to be displayed.

Suppose, for instance, that the second-type all-error icon 37 is displayed due to the second-type proxy error caused by a failure in authentication by the proxy server 9. In this case, as shown in FIG. 4, in response to the second-type all-error icon 37 being tapped, a Web connection setting screen 60 is displayed.

On the Web connection setting screen 60, a proxy setting key 61 for screen transition to a setting screen for the proxy server 9 is displayed. By looking at the Web connection setting screen 60, the user of the MFP 3 is allowed to recognize that settings for the proxy server 9 are responsible for the second-type proxy error. Then, by tapping the proxy setting key 61, the user is allowed to make a screen transition to the setting screen for the proxy server 9 and configure settings for the proxy server 9.

Subsequently, as exemplified in FIG. 5A, suppose for instance that the second-type individual-error icon 38 directed to the cloud note is displayed on the standby screen 50. It is also assumed that accounts of two users A and B are registered to use the cloud note, and the accounts are also usage-registered for the MFP 3 and the relay server 10. Further, for instance, it is assumed that the second-type error (e.g., capacity shortage) is occurring only for the account of the user A.

In this case, when the second-type individual-error icon 38 is tapped, the standby screen 50 is switched to the account selecting screen 70. As described above with reference to FIG. 2B, on the account selecting screen 70, a usage-registered-user key 72 is displayed for each usage-registered user. In this case, since the second-type error is occurring for the user A, the second-type error mark 86 is displayed on the usage-registered-user key 72 for the user A.

By looking at the account selecting screen 70, the user of the MFP 3 is allowed to recognize that the user A is unable to use the cloud note by some cause and that the user B is able to use the cloud note since there is no error occurring for the user B.

When the cloud key 52 is tapped on the standby screen 50, the standby screen 50 is switched to the cloud application selecting screen 55. As described above with reference to FIG. 2A, on the cloud application selecting screen 55, the application selecting keys 56, 57, and 58 are displayed each of which is associated with a corresponding one of the selectable cloud services. Nonetheless, in this case, since the second-type error is occurring in the cloud note, the second-type error mark 86 is displayed on the cloud note key 57.

Therefore, by looking at the cloud application selecting screen 55, the user of the MFP 3 is allowed to be aware that there is an error occurring in the cloud note. Then, further, by tapping the cloud note key 57 to make a screen transition to the account selecting screen 70, the user of the MFP 3 is allowed to realize that only the user A is unable to use the cloud note.

When the usage-registered-user key 72 for the user A is tapped on the account selecting screen 70, the function selecting screen 80 for the user A to use the cloud services is displayed. As described above with reference to FIG. 2B, on the function selecting screen 80, there are function selecting keys displayed each of which is associated with a corresponding one of the functions usable by the user A. By tapping one of the function selecting keys, it is possible to perform the selected function.

However, in this exemplified case, the second-type error for the user A is occurring since there is hardly an uploadable file capacity left for the user to newly upload files. Thus, it is not possible for the user A to upload any new file. Therefore, the second-type error mark 86 is displayed on each of the scan upload key 81 and the medium upload key 82.

When one of the scan upload key 81 and the medium upload key 82 on each of which the second-type error mark 86 is displayed is tapped, the function selecting screen 80 is switched to an error notification screen 90. On the error notification screen 90, one or more pieces of information are displayed that may include, e.g., a reason why the user A is not allowed to perform the function corresponding to the tapped function selecting key and information about how to resolve the error. When an OK key 91 is tapped on the error notification screen 90, the error notification screen 90 is switched back to the standby screen 40.

(5) Screen Control Process

Subsequently, an explanation will be provided of a screen control process to make the aforementioned various screen transitions, with reference to FIGS. 6 and 7. When the MFP 3 is booted, the CPU 21 of the controller 20 reads one or more programs for the screen control process from the storage 22 and executes the read programs. It is noted that the screen control process may be performed periodically at intervals of a particular period of time even after being once performed after the MFP 3 is booted. In addition, the screen control process may be performed again when an unused state of the MFP 3 is maintained for a particular period of time. Further, the screen control process may be performed at previously-set timing.

When the screen control process is started, the CPU 21 performs startup preparation including a particular initializing process, in S110. In the startup preparation, the CPU 21 controls the display 17 to display thereon the standby screen 40. In S120, the CPU 21 determines whether a wireless LAN is set on as a network connection method, or the wireless LAN is set off and a cable for a wired LAN has been inserted into the MFP 3. In the MFP 3, the user is allowed to previously set the wireless LAN on or off as a network connection method. When the wireless LAN is set off, the CPU 21 attempts to establish a network connection via the wired LAN without attempting to establish a network connection via the wireless LAN. Meanwhile, when the wireless LAN is set on, the CPU 21 attempts to establish a network connection via the wireless LAN.

When determining that the wireless LAN is set off, and a cable for a wired LAN has not been inserted into the MFP 3 (S120: No), the CPU 21 terminates the screen control process. When determining that the wireless LAN is set on, or a cable for a wired LAN has been inserted into the MFP 3 (S120: Yes), the CPU 21 goes to S130. In S130, the CPU 21 performs a network connection process. Namely, when the wireless LAN is set on, the CPU 21 establishes a connection with the AP 5 through a connection process with the AP 5. Meanwhile, when the wireless LAN is set off, the CPU 21 establishes a connection with a network device for the wired LAN through a connection process via the wired LAN.

In S140, the CPU 21 determines whether the network connection process in S130 has been completed. When failing in the network connection, in S150, the CPU 21 sets a second-type error flag and displays the second-type all-error icon 37 on the standby screen 40.

When determining that the network connection process in S130 has been completed (S140: Yes), the CPU 21 goes to S180. In this respect, however, when the wireless LAN is set on, and the wireless LAN connection with the AP 5 has been established in S130, in S170, the CPU 21 displays the wireless connection icon 47 on the standby screen 40, and then goes to S180.

In S180, the CPU 21 performs an IP address acquiring process. Namely, the CPU 21 acquires an IP address from the router 7. In S190, the CPU 21 determines whether the IP address has been acquired. When determining that the IP address has not been acquired (S190: No) and that this is due to the second-type error (Second-Type Error), the CPU 21 goes to S205. In S205, the CPU 21 sets a second-type IP error flag, and displays the second-type all-error icon 37 on the standby screen 40. After S205, the CPU 21 goes to S330 in FIG. 6C.

When the CPU 21 determines that the IP address has not been acquired (S190: No), and cannot definitely determine that this is due to the second-type error or determines that this is due to the first-type error (First-Type Error), the CPU 21 goes to S200. In S200, the CPU 21 determines that the first-type IP error is occurring, and sets a first-type IP error flag. Further, the CPU 21 increments an IP error determination number by one. The IP error determination number is the number of determinations of occurrence of the first-type IP error. After S200, the CPU 21 goes to S320 in FIG. 6C.

When determining that the IP address has been acquired (S190: Yes), the CPU 21 goes to S210. In S210, the CPU 21 determines whether a setting to use the proxy server 9 is valid. When determining that a setting to establish a connection with the Internet 200 without using the proxy server 9 is valid (S210: No), the CPU 21 goes to S250. When determining that the setting to use the proxy server 9 is valid (S210: Yes), the CPU 21 goes to S220.

In S220, the CPU 21 performs a proxy server connection process to establish a connection with the proxy server 9. In the proxy server connection process, the proxy server 9 performs an authentication process to authenticate the MFP 3. In S230, the CPU 21 determines whether the connection with the proxy server 9 has been established. When determining that the connection with the proxy server 9 has not been established (S230: No) and that this is due to the second-type error such as authentication failure (Second-Type Error), the CPU 21 goes to S245. In S245, the CPU 21 sets a second-type proxy error flag, and displays the second-type all-error icon 37 on the standby screen 40. After S245, the CPU 21 goes to S330 in FIG. 6C.

When the CPU 21 determines that the connection with the proxy server 9 has not been established (S230: No), and cannot definitely determine that this is due to the second-type error or determines that this is due to the first-type error such as the MFP 3 being still in the connection process (First-Type Error), the CPU 21 goes to S240. In S240, the CPU 21 determines that the first-type proxy error is occurring, and sets a first-type proxy error flag. Further, the CPU 21 increments a proxy error determination number by one. The proxy error determination number is the number of determinations of occurrence of the first-type proxy error. After S240, the CPU 21 goes to S320 in FIG. 6C. When determining that the connection with the proxy server 9 has been established (S230: Yes), the CPU 21 goes to S250.

In S250, the CPU 21 performs a relay server connection process to establish a connection with the relay server 10. In the relay server connection process, the relay server 10 performs an authentication process to authenticate the MFP 3. In S260, the CPU 21 determines whether the connection with the relay server 10 has been established. When determining that the connection with the relay server 10 has not been established (S260: No) and that this is due to the second-type error such as authentication failure (Second-Type Error), the CPU 21 goes to S275. In S275, the CPU 21 sets a second-type relay error flag, and displays the second-type all-error icon 37 on the standby screen 40. After S275, the CPU 21 goes to S330 in FIG. 6C.

When the CPU 21 determines that the connection with the relay server 10 has not been established (S260: No), and cannot definitely determine that this is due to the second-type error or determines that this is due to the first-type error such as the MFP 3 being still in the connection process (First-Type Error), the CPU 21 goes to S270. In S270, the CPU 21 determines that the first-type relay error is occurring, and sets a first-type relay error flag. Further, the CPU 21 increments a relay error determination number by one. The relay error determination number is the number of determinations of occurrence of the first-type relay error. After S270, the CPU 21 goes to S320 in FIG. 6C. When determining that the connection with the relay server 10 has been established (S260: Yes), the CPU 21 goes to S280.

In S320 (see FIG. 6C) to which the CPU 21 goes after S200, S240, and S270, the CPU 21 displays the first-type all-error icon 35 on the standby screen 40. After S320, the CPU 21 goes to S330.

In S280 shown in FIG. 6C, the CPU 21 searches for usage-registered cloud services in the MFP 3 and usage-registered users for each of the usage-registered cloud services. Information regarding the usage-registered users and the usage-registered cloud services is stored in storage 22.

In S290, based on a result of the search in S280, the CPU 21 performs an availability checking process to determine whether each individual usage-registered cloud service is available via the relay server 10, for each of the usage-registered accounts. More specifically, the CPU 21 issues a connection request to the relay server 10. Then, based on a response from the relay server 10 to the connection request, the CPU 21 makes the determination in S290.

In S300, based on a result of the determination in S290, when determining that there is an unusable account with which the corresponding user is not allowed to use one or more of the cloud services, the CPU 21 performs an error resolving process corresponding to a cause for the unusable account. For instance, when realizing that the second-type error (e.g., capacity shortage) is occurring in a specific account for a specific cloud service, the CPU 21 sets a second-type individual-error flag corresponding to the specific cloud service. Further, for instance, when realizing that the first-type error is occurring in a particular account for a particular cloud service, the CPU 21 sets a first-type individual-error flag corresponding to the particular cloud service, and increments by one an individual-error determination number corresponding to the particular cloud service. The individual-error determination number is the number of determinations of occurrence of the first-type individual-error corresponding to the particular cloud service. When there is a cloud service for which an individual-error flag is already set, and the CPU 21 determines in S290 that the cloud service is available, the CPU 21 clears an individual-error flag and an individual-error determination number for the cloud service.

In the following description, the first-type IP error flag, the first-type proxy error flag, the first-type relay error flag, and the first-type individual-error flag may be collectively referred to as a "first-type error flag." Further, the second-type IP error flag, the second-type proxy error flag, the second-type relay error flag, and the second-type individual-error flag may be collectively referred to as a "second-type error flag."

In S310, based on the results of the processes in S290 and S300, the CPU 21 performs an error icon display process. For instance, when determining in S290 that there is not an unusable account with which the corresponding user is not allowed to use one or more of the cloud services, the CPU 21 does not display any error icon on the standby screen 40. Meanwhile, when determining in S290 that there is an unusable account with which the corresponding user is not allowed to use one or more of the cloud services, and setting at least one of the first-type individual-error flag and the second-type individual-error flag, the CPU 21 displays one or more individual-error icon corresponding to the set error flag(s) on the standby screen 40. For instance, when a first-type individual-error flag is set, the CPU 21 displays the first-type individual-error icon 36 indicating a cloud service corresponding to the set flag. Further, for instance, when a second-type individual-error flag is set, the CPU 21 displays the second-type individual-error icon 38 indicating a cloud service corresponding to the set flag.

Further, when a plurality of individual-error flags are set in S300, the CPU 21 displays a plurality of individual-error icons respectively corresponding to the set flags in a particular display method. The display method may be determined appropriately as required. For instance, as exemplified in FIG. 3D, the display method may be a method to concurrently display all of the plurality of individual-error icons side by side. Further, for instance, the display method may be a method to display the individual-error icons one by one in a sequentially-switched manner at intervals of a particular period of time.

In S330, the CPU 21 determines whether at least one first-type error flag is set, i.e., whether the first-type error is occurring. When no first-type error flag is set at all, i.e., when no first-type error is occurring, the CPU 21 terminates the screen control process. When at least one first-type error flag is set, i.e., when at least one first-type error is occurring, the CPU 21 goes to S340.

In S340, the CPU 21 waits for a particular period of time. The particular period of time may be determined appropriately as required. For instance, in the illustrative embodiment, the particular period of time is one minute. After waiting for the particular period of time, the CPU 12 determines in S350 whether there is a first-type error of which an error determination number (i.e., the number of determinations of occurrence of the first-type error) is equal to or more than a particular number. The particular number may be determined appropriately as required. For instance, in the illustrative embodiment, the particular number is five.

When determining that there is not a first-type error of which the error determination number is equal to or more than the particular number (S350: No), the CPU 21 goes to S360. In S360, the CPU 21 goes to a retry point corresponding to the currently occurring first-type error among four retry points A, B, C, and D shown in FIGS. 6 and 7. For instance, when the first-type IP error flag is set, the CPU 12 goes to the retry point A and performs S180 and the following steps. Further, for instance, when the first-type proxy error flag is set, the CPU 12 goes to the retry point B and performs S220 and the following steps. Further, for instance, when the first-type relay error flag is set, the CPU 12 goes to the retry point C and performs S250 and the following steps. Further, for instance, when the first-type individual-error flag is set, the CPU 12 goes to the retry point D and performs S280 and the following steps.

Meanwhile, when determining that there is a first-type error of which the error determination number is equal to or more than the particular number (S350: Yes), the CPU 21 goes to S370. In S370, the CPU 21 clears an error flag for the first-type error, and clears the error determination number for the first-type error. In S380, the CPU 21 sets a second-type error flag corresponding to the first-type error. In S390, the CPU 21 changes the currently displayed first-type error icon for the first-type error to a second-type error icon corresponding to the set second-type error flag.

Suppose for instance that the first-type proxy error flag is set, and the proxy error determination number reaches five. In this case, in S370, the first-type proxy error flag and the proxy error determination number are cleared. In S380, the second-type proxy error flag is set. In S390, the currently displayed first-type all-error icon 35 is changed to the second-type all-error icon 37. Further, suppose for instance that the first-type individual-error flag directed to the net drive is set, and the individual-error determination number reaches five. In this case, in S370, the first-type individual-error flag directed to the net drive and the individual-error determination number are cleared. In S380, the second-type individual-error flag directed to the net drive is set. In S390, the currently displayed first-type individual-error icon 36 directed to the net drive is changed to the second-type individual-error icon 38.

In S400, the CPU 21 determines whether the first-type error flag is set. When determining that the first-type error flag is not set (S400: No), the CPU 21 terminates the screen control process. Meanwhile, when determining that the first-type error flag is set (S400: Yes), the CPU 21 goes to S360. It is noted that a case where a plurality of different first-type errors concurrently occur is generally a case where a plurality of first-type individual-errors occur. In such a case, the transition from S400 to S360 may be made.

(6) Sleep Recovery Process

Subsequently, a sleep recovery process will be described with reference to FIG. 7. In the MFP 3, when a particular sleep condition is satisfied after the MFP 3 is booted, the CPU 21 of the controller 20 comes into a sleep mode and stops processes other than one or more predetermined processes. It is noted that network connection states such as the connection established in S130 (see FIG. 6A) between the MFP 3 and the AP 5 are maintained even in the sleep mode.

Then, when a particular recovery condition is satisfied after the CPU 21 comes into the sleep mode, the CPU 21 is released from the sleep mode, and again performs the processes that have been stopped during the sleep mode. Further, in response to being released from the sleep mode, the CPU 21 reads one or more programs for the sleep recovery process (see FIG. 7) from the storage 22 and executes the read programs.

In response to the sleep recovery process being started, the CPU 21 determines in S510 whether the second-type all-error icon 37 is displayed on the standby screen 40, i.e., whether one of the second-type IP error flag, the second-type proxy error flag, and the second-type relay error flag is set.

When determining that the second-type all-error icon 37 is displayed (S510: Yes), the CPU 21 goes to S520. In S520, the CPU 21 clears a flag of a specific second-type error causing the second-type all-error icon 37 to be displayed, and goes to a retry process for the specific second-type error. For instance, when the second-type all-error icon 37 is displayed due to a malfunction of the proxy server 9, the CPU 21 goes to the retry point B (see FIG. 6B) in the screen control process and performs S220 and the following steps so as to reattempt to establish a connection with the proxy server 9.

Meanwhile, when determining that the second-type all-error icon 37 is not displayed (S510: No), i.e., when any of the second-type IP error flag, the second-type proxy error flag, and the second-type relay error flag is not set, the CPU 21 goes to S530.

In S530, the CPU 21 again performs the availability checking process for each usage-registered cloud service. Namely, in order to determine whether each individual usage-registered cloud service is available at the present time, the CPU 21 goes to the retry point D (see FIG. 6C) in the screen control process, and performs S280 and the following steps.

(7) Error Icon Corresponding Process

Next, an error icon corresponding process will be described with reference to FIG. 8. While an error icon is being displayed on a standby screen by the screen control process (see FIGS. 6A to 6C), the CPU 21 of the controller 20 reads one or more programs for the error icon corresponding process (see FIG. 8) from the storage 22, and periodically and repeatedly performs the error icon corresponding process.

In response to the error icon corresponding process being started, the CPU 21 determines in S610 whether an error icon has been tapped. When determining that an error icon has not been tapped (S610: No), the CPU 21 terminates the error icon corresponding process. Meanwhile, when determining that an error icon has been tapped (S610: Yes), the CPU 21 goes to S620. In S620, the CPU 21 determines whether the tapped error icon is an individual-error icon corresponding to a specific cloud service, i.e., whether the tapped error icon is one of the first-type individual-error icon 36 and the second-type individual-error icon 38.

When determining that the tapped error icon is not an individual-error icon corresponding to a specific cloud service (S620: No), the CPU 21 goes to S680. Meanwhile, when determining that the tapped error icon is an individual-error icon corresponding to a specific cloud service (S620: Yes), the CPU 21 goes to S630.

In S630, the CPU 21 determines whether the specific cloud service corresponding to the tapped individual-error icon needs account authentication. When determining that the specific cloud service corresponding to the tapped individual-error icon needs account authentication (S630: Yes), the CPU 21 goes to S680. Meanwhile, when determining that the specific cloud service corresponding to the tapped individual-error icon does not need account authentication (S630: No), the CPU 21 goes to S640.

In S640, the CPU 21 determines whether the error is occurring in only a part (i.e., one or more specific accounts) of the users registered to use the specific cloud service. When determining that the error is occurring in not only a part of the usage-registered users of the specific cloud service but the whole thereof (S640: No), the CPU 21 goes to S680.

In S680, the CPU 21 checks contents of the error corresponding to the tapped error icon. For instance, when the CPU 21 makes a transition from S620 to S680, it means that one of the first-type all-error icon 35 and the second-type all-error icon 37 has been tapped. In this case, the CPU 21 checks contents of the error that causes the tapped error icon to be displayed. As a result, for instance, the CPU 21 is allowed to identify which one of the first-type IP error, the first-type proxy error, the first-type relay error, the second-type IP error, the second-type proxy error, and the second-type relay error is the error corresponding to the tapped error icon. Further, the CPU 21 is allowed to specifically know details about the error and how to resolve the error.

Further, for instance, when the CPU 21 makes a transition from S630 to S680, it means that an individual-error icon corresponding to a cloud service that does not need account authentication has been tapped. In this case, in S680, for instance, the CPU 21 identifies which one of the first-type individual-error and the second-type individual-error is occurring, and recognizes that no matter which one of the first-type individual-error and the second-type individual-error is occurring, the error is occurring in not only a part (i.e., one or more specific accounts) of the usage-registered users of the specific cloud service but the whole thereof (i.e., none of the usage-registered users is allowed to use the specific cloud service). After S680, the CPU 21 goes to S690.

When determining that the error is occurring in only a part (i.e., one or more specific users) of the usage-registered users of the specific cloud service (S640: Yes), the CPU 21 goes to S650. In S650, the CPU 21 displays the account selecting screen 70 on which the users registered to use the specific cloud service are listed. In S660, the CPU 21 accepts an operation of selecting an account on the account selecting screen 70. At this time, as exemplified in FIG. 5A, on the account selecting screen 70, the second-type error mark 86 is displayed on the usage-registered-user key 72 of a specific account in which the error is occurring.

When the usage-registered-user key 72 on which the second-type error marl 86 is displayed is selected, in S670, the CPU 21 checks contents of the error occurring in the account associated with the selected usage-registered-user key 72.

In S690, the CPU 21 acquires transition destination screen information corresponding to the contents of the error checked in S670 or S680. The transition destination screen information is information on a next screen to be displayed so as to help the user appropriately address the error corresponding to the tapped error icon.

For instance, when the second-type all-error icon 37 is tapped that is displayed due to the settings for the proxy server 9 being not adequately configured or due to authentication failure in the proxy server 9, the CPU 21 acquires screen information of the Web connection setting screen 60 exemplified in FIG. 4. Further, for instance, when the second-type individual-error icon 38 is tapped that is displayed due to a specific account of a specific cloud server being unable to upload a file because of capacity shortage, the CPU 21 acquires screen information of the account selecting screen 70 exemplified in FIG. 5A.

In S700, the CPU 21 displays the screen identified based on the transition destination screen information acquired in S690. In S710, when an error-related key is selected on the screen displayed in S700, the CPU 21 performs a screen transition process corresponding to the selected error-related key. The error-related key represents a key on which the first-type error mark or the second-type error mark is displayed. As exemplified in FIGS. 5A and 5B, a screen transition to the function selecting screen 80 to be made when the usage-registered-user key 72 corresponding to the user A is tapped on the account selecting screen 70 is an example of the screen transition process in S710. Further, as exemplified in FIG. 5B, a screen transition from the function selecting screen 80 to the error notification screen 90 is also an example of the screen transition process in S710.

(8) Advantageous Effects of Illustrative Embodiment

According to the illustrative embodiment described above, the following advantageous effects are provided. While displaying a standby screen, even though any cloud application is not actually selected on the standby screen, the controller 20 of the MFP 3 determines whether each individual cloud application is available from the MFP 3. Then, when at least one cloud application is unavailable from the MFP 3, the controller 20 displays an error icon on the standby screen.

Therefore, by looking at the standby screen, the user of the MFP 3 is allowed to realize whether there is a cloud application that is not normally available. In other words, the user of the MFP 3 is allowed to easily and quickly recognize whether each individual cloud application is normally available. Thus, it is possible to improve user-friendliness of the MFP 3 configured to use cloud services therefrom.

Further, it is determined in a multi-stage manner whether each individual cloud service is available. Namely, firstly, when the controller 20 of the MFP 3 has failed to establish a connection with the AP 5, the controller 20 determines at that point of time that all of the cloud services are unavailable, and displays the second-type all-error icon 37 so as to inform the user of that state.

Further, even if the controller 20 has successfully established a connection with the AP 5, when the controller 20 has failed to acquire an IP address, the controller 20 determines that all of the cloud services are unavailable. In this case, when determining that an error is occurring that needs some treatment to resolve the unavailable condition and allow the MFP 3 to acquire an IP address, the controller 20 displays the second-type all-error icon 37. Meanwhile, when determining that the unavailable condition is highly likely to be naturally resolved after a lapse of time (i.e., when there is no malfunction to be resolved), the controller 20 displays the first-type all-error icon 35. The same applies when the MFP 3 has not established a connection with the proxy server 9 after successful acquisition of the IP address and when the MFP 3 has not established a connection with the relay server 10 after successful establishment of the connection with the proxy server 9.

When the first-type all-error icon 35 or the second-type all-error icon 37 is displayed on a standby screen, by looking at the displayed error icon, the user of the MFP 3 is allowed to easily realize that all of the cloud services are unavailable. Further, depending on whether the displayed error icon is the first-type all-error icon 35 or the second-type all-error icon 37, the user of the MFP 3 is allowed to recognize that the unavailable condition is highly likely to be resolved naturally after a lapse of time or that the unavailable condition is less likely to be resolved without any treatment. Therefore, the user of the MFP 3 is allowed to take appropriate measures depending on the occurring error.

Further, even though the connection with the relay server 10 is established, all of the cloud services are not necessarily available. For instance, a specific one of the cloud services might be unavailable since the corresponding cloud server is under maintenance, or an error is occurring in the cloud server. Further, it is likely that although the whole of a specific cloud service is not unavailable, a particular account might be restricted from using at least a partial function of the specific cloud service.

In contrast, the MFP 3 of the illustrative embodiment determines, for each usage-registered account with respect to each usage-registered cloud service, whether each individual account is allowed to use each individual cloud service. Then, when there is a specific cloud service that is unavailable with a particular account, an individual-error icon representing the specific cloud service is displayed. At that time as well, depending on what type of error is occurring (i.e., depending on whether the unavailable condition would be naturally resolved after a lapse of time), the first-type individual-error icon 36 or the second-type individual-error icon 38 is displayed.

Therefore, when an individual-error icon is displayed on a standby screen, the user of the MFP 3 is allowed to easily recognize which specific service of the cloud services is unavailable from the MFP 3.

Further, when there are a plurality of unavailable cloud services, an individual-error icon is displayed for each of the unavailable cloud services. Therefore, even when there are a plurality of unavailable cloud services, by looking at the individual-error icon for each of the unavailable cloud services, the user of the MFP 3 is allowed to easily recognize which specific services of the cloud services are unavailable from the MFP 3.

Various methods are considered as specific methods for displaying the plurality of individual-error icons on the standby screen. For instance, the plurality of individual-error icons may be collectively displayed at the same time. Further, the plurality of individual-error icons may be displayed one by one in a sequentially-switched manner. When the method to collectively and concurrently display the individual-error icons is applied, the user is allowed to quickly realize an error occurring situation at a glance. When the method to display the individual-error icons one by one in a sequentially-switched manner is applied, it is possible to reduce an area for displaying the individual-error icons within the display area on the standby screen.

Thus, in the MFP 3 of the illustrative embodiment, when such an error that a part or the whole of the cloud services are unavailable is occurring, an error icon corresponding to the error is displayed on a standby screen. Therefore, the user of the MFP 3 is allowed to know information regarding what type of error is occurring and whether the error would be naturally resolved after a lapse of time (even without any measures to resolve the error), from the standby screen. Therefore, the user is allowed to efficiently grasp and address problems to be resolved, from the information on the standby screen.

Further, when an error icon displayed on the standby screen is tapped, as exemplified in FIGS. 4 and 5, the standby screen is switched to a screen corresponding to the tapped error icon. At that time, the standby screen may be soon switched to the error notification screen 90. Nonetheless, in the illustrative embodiment, for a cloud service that needs account registration, the account selecting screen 70 is displayed to list thereon the accounts of the users registered to use the cloud service. On the account selecting screen 70, an error mark is additionally displayed on a key of an account in which an error is occurring. Therefore, by looking at the account selecting screen 70, the user is allowed to recognize in which account of the listed accounts the error is occurring.

Further, when a key of a particular account is tapped on the account selecting screen 70, the account selecting screen 70 is switched to the function selecting screen 80. On the function selecting screen 80, an error mark is additionally displayed on a key of each unavailable function. Therefore, by looking at the function selecting screen 80, the user is allowed to know various kinds of information, e.g., information regarding which function of the functions is unavailable, i.e., which function of the functions is available, or whether all of the functions are unavailable.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

[Modifications]

In the aforementioned illustrative embodiment, as shown in 5280 and 5290 in FIG. 6C, the controller 20 (more specifically, the CPU 21) of the MFP 3 searches for usage-registered cloud services in the MFP 3 and usage-registered users for each of the usage-registered cloud services, and determines whether each individual usage-registered cloud service is currently available, for each of the usage-registered accounts. Nonetheless, the controller 20 of the MFP 3 may search for all cloud applications installed in the MFP 3, regardless of whether the installed cloud applications are for the usage-registered cloud services. Further, the controller 20 of the MFP 3 may determine whether each individual one of all the installed cloud applications is currently available. For instance, with respect to each cloud application installed in the MFP 3, the controller 20 of the MFP 3 may access a corresponding cloud server via the relay server 10 and determine whether a corresponding cloud service is available at the present time. In that case, with respect to an unregistered cloud service that is not usage-registered, for instance, the controller 20 of the MFP 3 may determine whether the unregistered cloud service is currently available for each individual user having a usage-registered account. Then, when the unregistered cloud service is currently unavailable by some cause even for a user having a usage-registered account, the controller 20 of the MFP 3 may determine that an error is occurring in the unregistered cloud service and display an error icon.

When the MFP 3 has a login function, and a particular user is logging in to the MFP 3, in S280 shown in FIG. 6C, the controller 20 of the MFP 3 may search for only cloud services registered to be used by the login user.

A function to display error icons may be set valid or invalid. The MFP 3 may be configured to, when the function is set invalid, not display any error icon.

The MFP 3 may be configured to, when there is no error occurring, display on a standby screen an icon representing that there is no error occurring, i.e., that each usage-registered user is currently allowed to use corresponding usage-registered cloud services.

In the example of screen transitions shown in FIGS. 5A and 5B, when there is only a single usage-registered user, the screen transition to the account selecting screen 70 may be omitted. Namely, for instance, when the user A is only registered to use the cloud note, in response to the second-type individual-error icon 38 being tapped on the standby screen 50, the standby screen 50 may be switched directly to the function selecting screen 80 without a transition to the account selecting screen 70.

Image data of error icons may be previously stored in the MFP 3. In this case, for instance, the image data may be periodically updated by firmware updating.

As another option, the image data of the error icons may be collectively stored in the relay server 10. In this case, in each attempt to display a specific error icon on the display 17, the controller 20 of the MFP 3 may request the relay server 10 to transmit image data of the specific error icon, acquire the image data of the specific error icon from the relay server 10 via the network, and display the specific error icon based on the acquired image data. Further, in this case, the relay server 10 may store location information (e.g., an address of a server storing the image data) of the image data without storing the image data itself, acquire the image data of the requested error icon from the server in response to receiving the request from the MFP 3, and transmit the acquired image data to the MFP 3. Further, for instance, the MFP 3 may store the location information of the image data. In this case, in an attempt to display a specific error icon on the display 17, the controller 20 of the MFP 3 may acquire image data of the specific error icon directly or via the relay server 10, based on the location information stored in the MFP 3.

The MFP 3 may not necessarily be required to use the proxy server 9. Further, the MFP 3 may not necessarily be required to access each cloud server via the relay server 10. The MFP 3 may access each cloud server without using the relay server 10 and perform direct data communication with each cloud server.

A function of a single element exemplified in the aforementioned illustrative embodiment may be achieved in a dispersed manner by a plurality of elements. Further, respective functions of a plurality of elements may be achieved in an integrated manner by a single element. Further, at least a part of a configuration exemplified in the aforementioned illustrative embodiment may be replaced with a known configuration having substantially the same function. Further, a part of a configuration exemplified in the aforementioned illustrative embodiment may be omitted. Further, at least a part of a configuration exemplified in the aforementioned illustrative embodiment may be added to another configuration exemplified in the aforementioned illustrative embodiment. Further, at least a part of a configuration exemplified in the aforementioned illustrative embodiment may be replaced with another configuration exemplified in the aforementioned illustrative embodiment.

What is claimed is:

1. A function execution apparatus comprising:
   a display;
   a user interface;
   a communication interface connectable with a communication network; and
   a controller configured to:
   display on the display a standby screen for selecting a specific function from among one or more functions of the function execution apparatus, the standby screen including one or more selectable function images each associated with a corresponding one of the one or more functions, the specific function being selected by selecting a corresponding one of the one or more selectable function images on the standby screen, the one or more functions including a file processing function to use a file storage service provided by a service providing apparatus when data communication with the service providing apparatus is performed through the communication network via the communication interface;
   determine, while the one or more functions are in a non-selected state, whether the file processing function is in an executable condition in which one or more requirements are satisfied, the one or more requirements including at least a requirement that the communication interface is successfully connected with the service providing apparatus via the communication network;
   in response to determining that the file processing function is in an unexecutable condition in which the one or more requirements are not satisfied, display on the standby screen an error image representing that the file processing function is in the unexecutable condition, simultaneously with at least one of the one or more selectable function images;
   in response to determining that the file processing function is in the executable condition, accept, via the user interface, a selection of the specific function from among the one or more functions in a state where the standby screen is displayed without the error image thereon; and
   in response to accepting the selection of the specific function, execute the selected specific function.

2. The function execution apparatus according to claim 1, wherein the communication interface is configured to communicate with a plurality of service providing apparatuses via the communication network, the plurality of service providing apparatuses being configured to provide respective file storage services, and
   wherein the controller is further configured to execute file processing functions that correspond to the file storage services provided by the plurality of service providing apparatuses, respectively, the controller being further configured to:
   determine whether each individual one of the file processing functions is in the executable condition; and
   in response to determining that at least one of the file processing functions is in the unexecutable condition, display on the standby screen an individual-error image representing the at least one file processing function determined to be in the unexecutable condition.

3. The function execution apparatus according to claim 2, wherein the controller is further configured to, in response to determining that two or more file processing functions are in the unexecutable condition, display two or more individual-error images different from each other, the two or more individual-error images representing the two or more file processing functions determined to be in the unexecutable condition, respectively.

4. The function execution apparatus according to claim 3, wherein the controller is further configured to, in response to determining that the two or more file processing functions are in the unexecutable condition, display the two or more individual-error images one by one in a sequentially-switched manner.

5. The function execution apparatus according to claim 2, wherein the controller is further configured to, in response to determining that all of the file processing functions are in the unexecutable condition, display an all-error image representing that all of the file processing functions are in the unexecutable condition.

6. The function execution apparatus according to claim 5, wherein the communication interface is configured to communicate with the plurality of service providing apparatuses via a relay apparatus, and
wherein the controller is further configured to:
determine whether it is possible to perform data communication with the relay apparatus via the communication interface; and
in response to determining that it is not possible to perform data communication with the relay apparatus via the communication interface, determine that all of the file processing functions are in the unexecutable condition.

7. The function execution apparatus according to claim 2, wherein the controller is further configured to:
after the function execution apparatus is booted, acquire an IP address via the communication interface;
determine whether the IP address has been acquired;
in response to determining that the IP address has not been acquired, determine that all of the file processing functions are in the unexecutable condition; and
in response to determining that the IP address has been acquired, perform data communication with the plurality of service providing apparatuses in accordance with an Internet protocol, using the acquired IP address.

8. The function execution apparatus according to claim 1, wherein the controller is further configured to:
accept a selection of the error image displayed on the standby screen, via the user interface; and
in response to accepting the selection of the error image via the user interface, display an error corresponding screen on the display instead of the standby screen, the error corresponding screen including at least one of information regarding a cause for the error image displayed on the standby screen and information regarding how to eliminate the cause.

9. The function execution apparatus according to claim 1, wherein the controller comprises:
a processor; and
a storage storing processor-executable instructions configured to, when executed by the processor, cause the processor to:
display the standby screen on the display;
determine whether the file processing function is in the executable condition;
in response to determining that the file processing function is in the unexecutable condition, display the error image on the standby screen;
accept, via the user interface, the selection of the specific function from among the one or more functions in the state where the standby screen is displayed; and
in response to accepting the selection of the specific function, execute the specific function.

10. The function execution apparatus according to claim 1,
wherein the communication interface is configured to communicate with a plurality of cloud servers via the communication network, the plurality of cloud servers being configured to provide a plurality of cloud services, respectively, and
wherein the controller is further configured to execute file processing functions using the plurality of cloud services provided by the plurality of cloud servers, respectively, the controller being further configured to:
determine whether each individual one of the file processing functions is in an executable condition in which one or more requirements for each individual one of the file processing functions are satisfied, the one or more requirements including at least a requirement that the communication interface is successfully connected with a corresponding one of the plurality of cloud servers via the communication network;
in response to determining that an individual function of the file processing functions is in an unexecutable condition in which the one or more requirements for the individual function are not satisfied, display on the standby screen an individual-error image representing the individual function determined to be in the unexecutable condition; and
in response to determining that the individual function is in the executable condition, not display the individual-error image for the individual function on the standby screen.

11. A method adapted to be implemented on a processor coupled with a function execution apparatus comprising a display, a user interface, and a communication interface, the method comprising:
displaying on the display a standby screen for selecting a specific function from among one or more functions of the function execution apparatus, the standby screen including one or more selectable function images each associated with a corresponding one of the one or more functions, the specific function being selected by selecting a corresponding one of the one or more selectable function images on the standby screen, the one or more functions including a file processing function to use a file storage service provided by a service providing apparatus when data communication with the service providing apparatus is performed through a communication network via the communication interface;
determining, while the one or more functions are in a non-selected state, whether the file processing function is in an executable condition in which one or more requirements are satisfied, the one or more requirements including at least a requirement that the communication interface is successfully connected with the service providing apparatus via the communication network;
in response to determining that the file processing function is in an unexecutable condition in which the one or more requirements are not satisfied, displaying on the standby screen an error image representing that the file processing function is in the unexecutable condition, simultaneously with at least one of the one or more selectable function images;
in response to determining that the file processing function is in the executable condition, accepting, via the user interface, a selection of the specific function from among the one or more functions in a state where the standby screen is displayed without the error image thereon; and in response to accepting the selection of the specific function, executing the selected specific function.

12. A non-transitory computer-readable medium storing computer-readable instructions that are executable by a processor coupled with a function execution apparatus comprising a display, a user interface, and a communication interface, the instructions being configured to, when executed by the processor, cause the processor to:

display on the display a standby screen for selecting a specific function from among one or more functions of the function execution apparatus, the standby screen including one or more selectable function images each associated with a corresponding one of the one or more functions, the specific function being selected by selecting a corresponding one of the one or more selectable function images on the standby screen, the one or more functions including a file processing function to use a file storage service provided by a service providing apparatus when data communication with the service providing apparatus is performed through a communication network via the communication interface;

determine, while the one or more functions are in a non-selected state, whether the file processing function is in an executable condition in which one or more requirements are satisfied, the one or more requirements including at least a requirement that the communication interface is successfully connected with the service providing apparatus via the communication network;

in response to determining that the file processing function is in an unexecutable condition in which the one or more requirements are not satisfied, display on the standby screen an error image representing that the file processing function is in the unexecutable condition, simultaneously with at least one of the one or more selectable function images;

in response to determining that the file processing function is in the executable condition, accept, via the user interface, a selection of the specific function from among the one or more functions in a state where the standby screen is displayed without the error image thereon; and in response to accepting the selection of the specific function, execute the selected specific function.

* * * * *